United States Patent
Kayama

(10) Patent No.: US 9,601,105 B2
(45) Date of Patent: Mar. 21, 2017

(54) SOUND SYNTHESIZING APPARATUS AND METHOD, SOUND PROCESSING APPARATUS, BY ARRANGING PLURAL WAVEFORMS ON TWO SUCCESSIVE PROCESSING PERIODS

(75) Inventor: Hiraku Kayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 175 days.

(21) Appl. No.: 13/599,971

(22) Filed: Aug. 30, 2012

(65) Prior Publication Data

US 2013/0231928 A1  Sep. 5, 2013

(30) Foreign Application Priority Data

Mar. 2, 2012 (JP) ................................ 2012-046505

(51) Int. Cl.

| | | |
|---|---|---|
| G10L 21/00 | (2013.01) | |
| G10L 15/00 | (2013.01) | |
| G10L 13/00 | (2006.01) | |
| G10L 13/07 | (2013.01) | |
| G10L 25/93 | (2013.01) | |
| G10H 7/00 | (2006.01) | |
| G10H 7/02 | (2006.01) | |

(Continued)

(52) U.S. Cl.
CPC ............. *G10L 13/07* (2013.01); *G10H 1/125* (2013.01); *G10H 7/008* (2013.01); *G10H 7/02* (2013.01); *G10L 25/93* (2013.01); *G10H 2220/126* (2013.01); *G10H 2250/035* (2013.01); *G10H 2250/455* (2013.01); *G10H 2250/471* (2013.01); *G10L 15/22* (2013.01)

(58) Field of Classification Search
CPC ......... G10L 25/93; G10L 19/10; G10L 13/07; G10L 13/08; H05K 999/99
USPC ........ 704/214, 218, 216, 258, 266, 267, 263
See application file for complete search history.

(56) References Cited

U.S. PATENT DOCUMENTS

| | | | | |
|---|---|---|---|---|
| 5,479,564 A | * | 12/1995 | Vogten et al. ................. | 704/267 |
| 5,933,808 A | * | 8/1999 | Kang et al. .................... | 704/278 |
| 6,006,185 A | * | 12/1999 | Immarco ....................... | 704/251 |

(Continued)

FOREIGN PATENT DOCUMENTS

| | | |
|---|---|---|
| CN | 1702736 A | 11/2005 |
| EP | 1 220 195 A2 | 7/2002 |

(Continued)

OTHER PUBLICATIONS

Kang et al., Speech Analysis and Synthesis Based on Pitch-Synchronous Segmentation of the Speech Waveform, Naval Research Laboratory, NRL/FR/5550-94-9743, Nov. 9, 1994, p. 1-51.*

(Continued)

*Primary Examiner* — Farzad Kazeminezhad
(74) *Attorney, Agent, or Firm* — Morrison & Foerster LLP

(57) ABSTRACT

A sound synthesizing apparatus includes a waveform storing section which stores a plurality of unit waveforms extracted from different positions, on a time axis, of a sound waveform indicating a voiced sound, and a waveform generating section which generates, for each of a first processing period and a second processing period, a synthesized waveform by arranging the plurality of unit waveforms on the time axis, wherein the second processing period is an immediately succeeding processing period after the first processing period.

21 Claims, 15 Drawing Sheets

(51) Int. Cl.
*G10H 1/12* (2006.01)
*G10L 15/22* (2006.01)

(56) References Cited

U.S. PATENT DOCUMENTS

| | | | | |
|---|---|---|---|---|
| RE39,336 E | * | 10/2006 | Pearson et al. | 704/258 |
| 7,558,727 B2 | * | 7/2009 | Gigi | 704/207 |
| 7,630,896 B2 | * | 12/2009 | Tamura et al. | 704/258 |
| 2003/0009336 A1 | * | 1/2003 | Kenmochi et al. | 704/258 |
| 2003/0182106 A1 | * | 9/2003 | Bitzer et al. | 704/207 |
| 2004/0220801 A1 | | 11/2004 | Sato | |
| 2006/0074678 A1 | * | 4/2006 | Pearson et al. | 704/267 |
| 2006/0111908 A1 | * | 5/2006 | Sakata | 704/258 |
| 2006/0178873 A1 | * | 8/2006 | Gigi | 704/207 |
| 2007/0106513 A1 | * | 5/2007 | Boillot et al. | 704/260 |
| 2007/0185708 A1 | * | 8/2007 | Manjunath et al. | 704/207 |
| 2007/0288233 A1 | * | 12/2007 | Kim | 704/208 |
| 2008/0056511 A1 | * | 3/2008 | Zhang | G10L 19/005 381/94.4 |
| 2012/0143611 A1 | * | 6/2012 | Qian | G10L 13/07 704/260 |

FOREIGN PATENT DOCUMENTS

| | | |
|---|---|---|
| EP | 1 220 195 A3 | 7/2002 |
| JP | 2007-240564 A | 9/2007 |
| WO | WO-2004/027753 A1 | 4/2004 |

OTHER PUBLICATIONS

Partial European Search Report mailed Dec. 21, 2013, for EP Application No. 12182492.4, six pages.

Extended European Search Report mailed Sep. 13, 2013, for EP Application No. 12182492.4, eleven pages.

Chinese Search Report with mailing date of Jan. 4, 2015, for CN Application No. 201210320511.2, with English translation, 4 pages.

Notification of the First Office Action dated Jan. 4, 2015, for CN Application No. 201210320511.2, with English translation, 11 pages.

Notification of the Second Office Action dated Aug. 25, 2015, for CN Application No. 201210320511.2, with English translation, eight pages.

* cited by examiner

SOUND SEGMENT

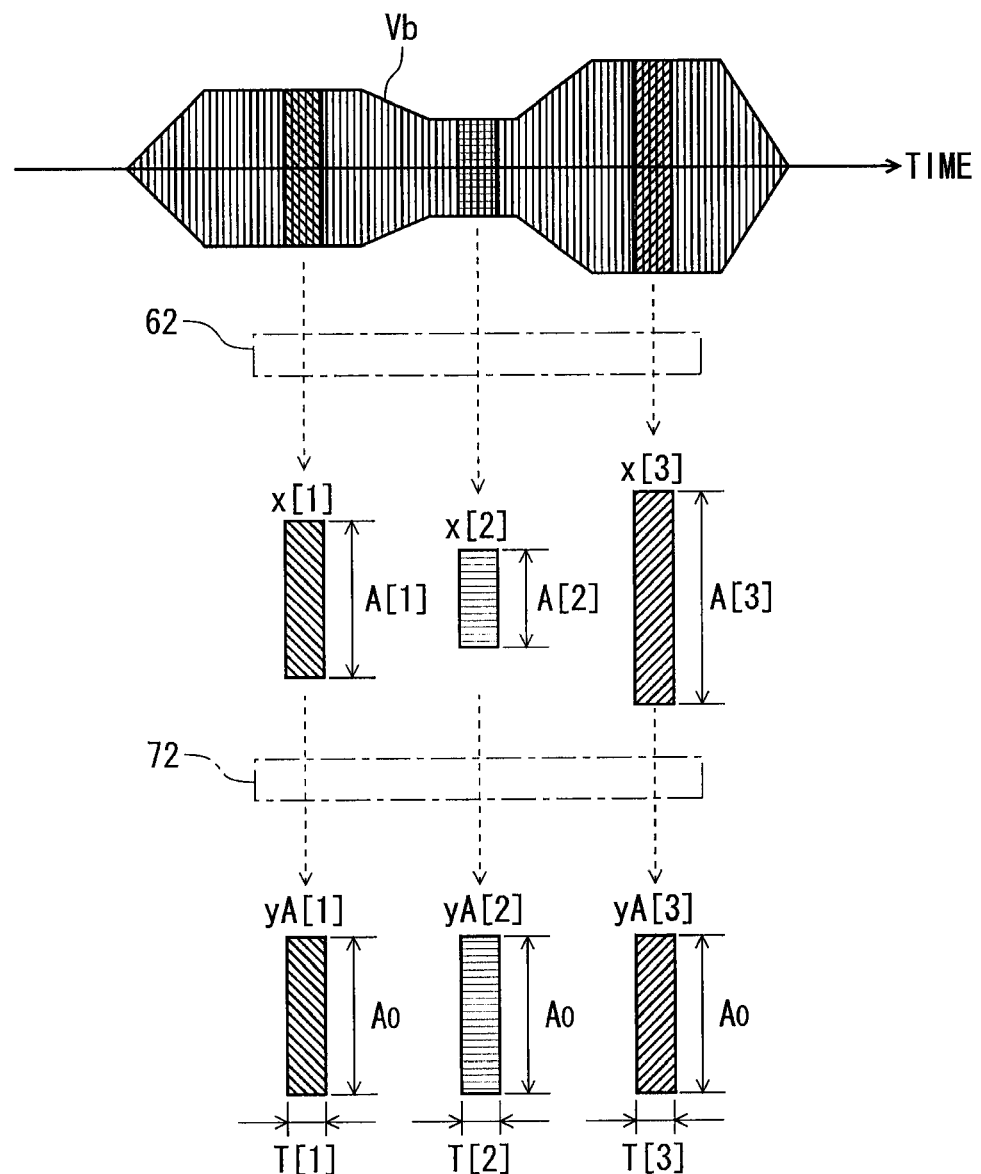

SOUND SYNTHESIZING APPARATUS AND METHOD, SOUND PROCESSING APPARATUS, BY ARRANGING PLURAL WAVEFORMS ON TWO SUCCESSIVE PROCESSING PERIODS

BACKGROUND

The present invention relates to a technology to synthesize a sound (an uttered sound or a singing sound) by using sound segments.

A segment connection type sound synthesis has conventionally been proposed in which a sound specified as an object of sound synthesis (hereinafter, referred to as "sound to be synthesized") is generated by connecting a plurality of previously extracted sound waveforms. For example, according to the technology of JP-A-2007-240564, previously extracted sound waveforms (segment data) are stored in a storage device for each sound segment, and the sound waveforms corresponding to the uttered letters (for example, lyrics) of the sound to be synthesized are successively selected from the storage device and connected together to thereby generate a sound signal of the sound to be synthesized.

According to the technology of JP-A-2007-240564, when a time length longer than the sound waveform stored in the storage device is specified as the duration of the sound to be synthesized, the sound waveform is repeated (looped) to thereby generate the sound signal. Consequently, a problem occurs in that a regular change of feature (for example, a change of the amplitude or the period) with the time length of the sound waveform as one period is caused and this degrades the sound quality perceived by the listener. Although this problem is solved by securing a sufficient time length for each sound waveform to the extent that makes it unnecessary to repeat the sound waveform, an enormous storage capacity is necessary for the sound waveform over a long time to be stored.

SUMMARY

In view of these circumstances, an object of the present invention is to prevent the sound quality degradation resulting from the repetition of the sound waveform while reducing the storage capacity necessary for sound synthesis.

Also, another object of the invention is to realize a sound synthesizing process which prevents the deterioration of sound quality caused by a repeat of the sound waveform for generating the sound signal to thereby reduce data amount of sound waveform required for sound synthesis.

Measures that the present invention adopts for solving the above-mentioned problem will be described.

(1) There is provided a sound synthesizing apparatus comprising:

a waveform storing section configured to store a plurality of unit waveforms extracted from different positions, on a time axis, of a sound waveform indicating a voiced sound; and a waveform generating section configured to generate a synthesized waveform by arranging the plurality of unit waveforms on the time axis.

(2). For example, the waveform generating section configured to generate, for each of a plurality of processing periods, the synthesized waveform which is a sum of a first waveform series in which a plurality of first unit waveforms selected from among the plurality of unit waveforms are arranged so that intensities thereof increase with time in the processing period and a second waveform series in which a plurality of second unit waveforms selected from among the plurality of unit waveforms and being different from the first unit waveforms are arranged so that intensities thereof decrease with time in the processing period.

(3) For example, each of the plurality of unit waveforms corresponds to one period of the sound waveform.

(4) For example, the plurality of unit waveforms have a common peak-to-peak value.

(5) For example, the plurality of unit waveforms have a common time length.

(6) For example, the plurality of unit waveforms have phases which are adjusted so that a cross-correlation function between the unit waveforms is highest.

(7) For example, the first unit waveform in one processing period of the plurality of processing periods and the second unit waveform in a processing period immediately succeeding the one processing period of the plurality of processing periods are a common unit waveform.

(8) For example, the waveform generating section configured to select the first unit waveform from the plurality of unit waveforms randomly for each processing period.

(9) For example, the waveform generating section configured to set that time lengths of the plurality of processing periods so that a time length of one processing period of the plurality of processing periods and a time length of another processing period of the plurality of processing periods are different to each other.

(10) For example, the waveform generating section configured to set a time length of each of the plurality of processing periods randomly.

(11) There is also provided a sound processing apparatus for generating the plurality of unit waveforms used in the sound synthesizing apparatus, the sound processing apparatus comprising:

a waveform extracting section configured to extract the plurality of unit waveforms from the different positions, on the time axis, of the sound waveform indicating the voiced sound; and a waveform correcting section configured to correct the plurality of unit waveforms extracted by the waveform extracting section so that acoustic features of the unit waveforms are close to each other.

(12) For example, the waveform correcting section includes a period correcting section configured to correct the time lengths of the plurality of the unit waveforms so as to be a common predetermined length.

(13) For example, the period correcting section includes: an index calculating section configured to calculate, for each of a plurality of candidate lengths being different to each other, a distortion index value indicating a degree of distortion of each of the plurality of unit waveforms when each of the plurality of unit waveforms is extended or contracted to a candidate length on the time axis; and a correction processing section configured to select a candidate length having a distortion index value indicating a minimum degree of distortion from the plurality of candidate lengths as the common predetermined length and to adjust the time lengths of the plurality of the unit waveforms so as to be the common predetermined length.

(14) For example, the sound processing apparatus further includes a distortion correcting section configured to correct, for the time lengths of the plurality of unit waveforms extracted by the waveform extracting section, amplitudes of the plurality of unit waveforms so that the amplitudes thereof are increased in accordance with a length of the common predetermined length.

(15) There is also provided a sound synthesizing method comprising:
storing a plurality of unit waveforms extracted from different positions, on a time axis, of a sound waveform indicating a voiced sound; and
generating a synthesized waveform by arranging the plurality of unit waveforms on the time axis.

(16) There is also provided, a sound synthesizing method, comprising:
a first step of selecting, for each of a plurality of processing periods, two unit waveform from a plurality of unit waveforms extracted from different positions, on a time axis, of a sound waveform; and
a second step of generating, for each of the plurality of processing periods, a synthesized waveform based on the selected two unit waveform.

(17) For example, in the first step, the two unit waveforms are selected randomly or definitely.

(18) For example, the sound waveform is a sound waveform indicating a voiced sound.

(19) For example, the sound synthesizing method further includes a third step of generating segment waveform by arranging synthesized waveforms generated for each of the plurality of processing periods on the time axis.

(20) There is also provided a sound synthesizing apparatus comprising:
a selecting section configured to select, for each of a plurality of processing periods, two unit waveform from a plurality of unit waveforms extracted from different positions, on a time axis, of a sound waveform; and
a generating section configured to generate, for each of the plurality of processing periods, a synthesized waveform based on the selected two unit waveform.

BRIEF DESCRIPTION OF THE DRAWINGS

The above objects and advantages of the present invention will become more apparent by describing in detail preferred exemplary embodiments thereof with reference to the accompanying drawings, wherein:

FIG. 8 is an explanatory view of an operation of an amplitude corrector;

DETAILED DESCRIPTION OF EXEMPLARY EMBODIMENTS

A: First Embodiment

Figure 1:
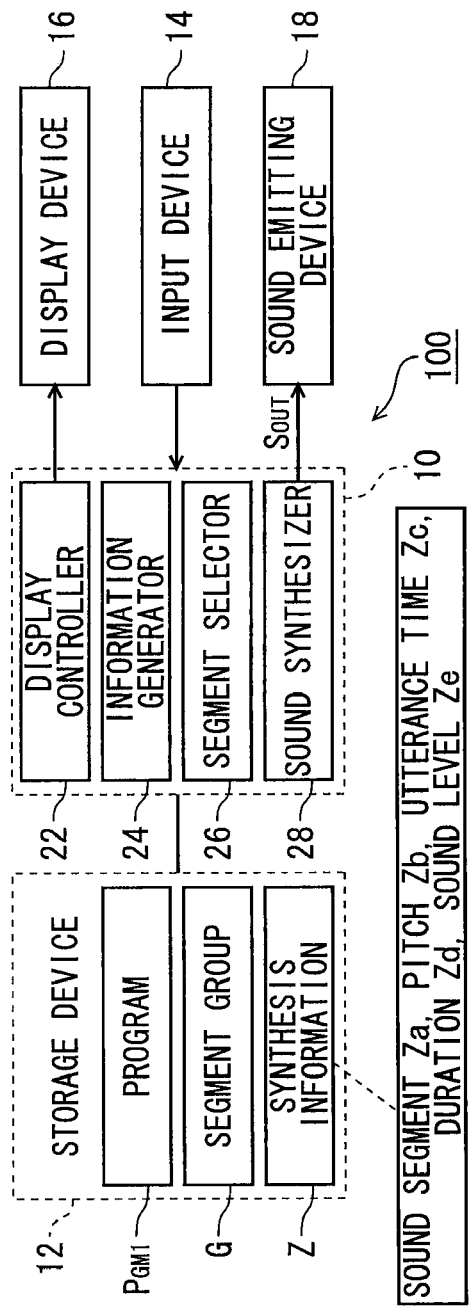
FIG. 1 is a block diagram of a sound synthesizing apparatus according to a first embodiment of the present invention.

FIG. 1 is a block diagram of a sound synthesizing apparatus 100 according to a first embodiment of the present invention. The sound synthesizing apparatus 100 is a sound processing apparatus that generates a sound to be synthesized such as a singing sound or an uttered sound by the segment connection type sound synthesis, and as shown in FIG. 1, is implemented as a computer system which includes an arithmetic processing unit 10, a storage device 12, an input device 14, a display device 16 and a sound emitting device 18.

The arithmetic processing unit 10 (CPU) executes a program PGM1 stored in the storage device 12 to thereby implement a plurality of functions (a display controller 22, an information generator 24, a segment selector 26 and a sound synthesizer 28) for generating a sound signal SOUT as the sound to be synthesized. The sound signal SOUT is an acoustic signal representative of the waveform of the sound to be synthesized. The following configurations may be adopted: a configuration in which the functions of the arithmetic processing unit 10 are distributed to a plurality of integrated circuits; and a configuration in which a dedicated electronic circuit (for example, DSP) implements the functions.

The storage device 12 stores the program PGM1 executed by the arithmetic processing unit 10 and various pieces of information (a segment group G, synthesis information Z) used by the arithmetic processing unit 10. A known recording medium such as a semiconductor storage medium or a magnetic recording medium, or a combination of a plurality of kinds of recording media is adopted as the storage device 12.

The segment group G is a set of a plurality of pieces of segment data W (sound synthesis library). Each piece of segment data W is a sample series representative of the waveform of the sound segment on the time axis, and is used as a material of sound synthesis. The sound segment is one phoneme corresponding to the minimum unit in a linguistic sense or a phoneme chain (for example, a diphone or a triphone) where a plurality of phonemes are coupled together. In the following, for descriptive purposes, explanation will be given with silence as one phoneme (symbol #).

The sound segment is classified into a stationary segment whose acoustic feature is stationary and an articulation segment whose acoustic feature fluctuates with time. A typical example of the stationary segment is a sound segment of a voiced sound (a voiced vowel or a voiced consonant) consisting of one phoneme, and a typical example of the articulation segment is a sound segment of an unvoiced sound (an unvoiced consonant) consisting of one phoneme or a sound segment (phoneme chain) consisting of a plurality of phonemes (voiced sounds or unvoiced sounds) and including a transition between phonemes.

Figure 2B:
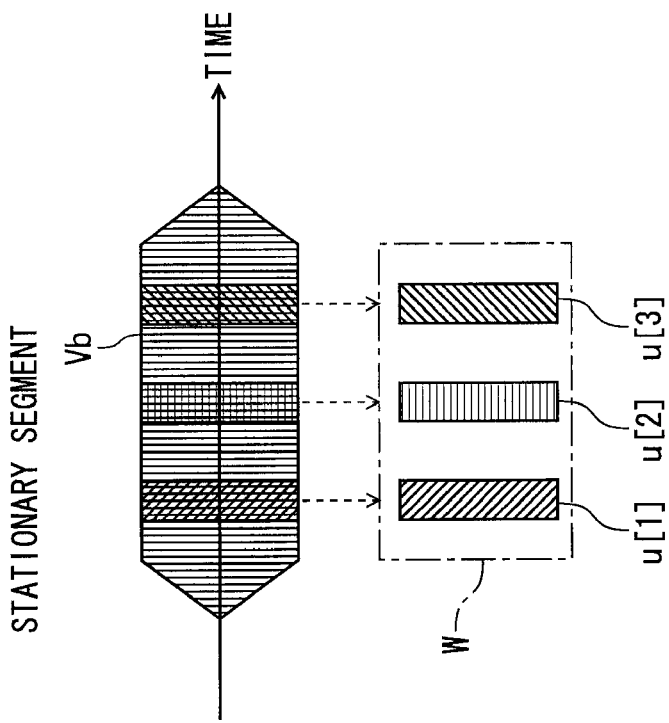
FIGS. 2A and 2B are explanatory views of segment data of an articulation segment and a stationary segment.
Figure 2A:
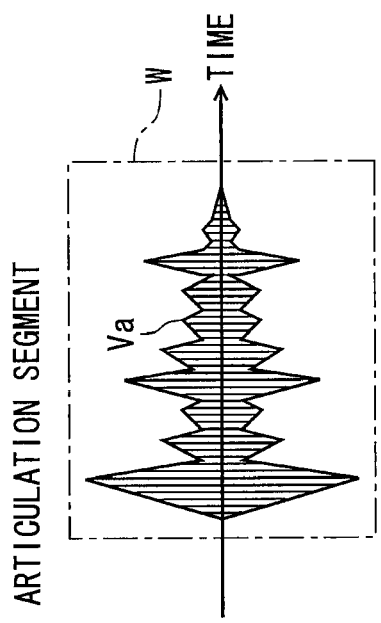

FIG. 2A shows a sound waveform (envelope) Va of the articulation segment, and FIG. 2B shows a sound waveform (envelope) Vb of the stationary segment. For the sound segments classified as the articulation segment, as shown in FIG. 2A, the sample series over the entire section of the sound waveform Va when a specific utterer utters the sound segment is stored in the storage device 12 as the segment data W. On the other hand, for the sound segments classified as the stationary segment, as shown in FIG. 2B, a set of sample series of a number M (three in the following illustration) of unit waveforms u[1] to u[M] extracted from different positions, on the time axis, of the sound waveform Vb (section where the acoustic feature is maintained stationary) when a specific utterer utters the sound segment is stored in the storage device 12 as the segment data W. In the first embodiment, the unit waveforms u[m] (m=1 to M) corresponding to one stationary segment are sections with a time length T0 corresponding to one period (for example, approximately several milliseconds) of the sound waveform Vb of a temporally continuous voiced sound. The acoustic features of the number M of unit waveforms u[1] to u[M] are similar to one another to the extent of being perceived as a common sound segment by the listener. However, since they are extracted from the different time points of the sound waveform Vb, the acoustic features (waveforms) of the number M of unit waveforms u[1] to u[M] are different from one another within a range of variation (fluctuation) of the acoustic feature when one sound segment is continuously uttered.

The synthesis information Z stored in the storage device 12 of FIG. 1 is information (score data) that chronologically specifies the sound to be synthesized. As shown in FIG. 1, the synthesis information Z specifies the pitch Zb, the utterance time Zc, the duration Zd and the sound level Ze for each of a plurality of sound segments Za constituting the sound to be synthesized. In addition to the illustrated information (or instead of the information), information such as the volume or the velocity may be specified by the synthesis information Z.

The input device 14 is a device (for example, a pointing device such as a mouse, a keyboard or a touch panel) that accepts instructions from the user. The display device 16 (for example, a liquid crystal display device) displays an image specified by the arithmetic processing unit 10. The sound emitting device 18 (for example, a speaker or a headphone) emits a sound wave corresponding to the sound signal SOUT generated by the arithmetic processing unit 10.

Figure 3A:
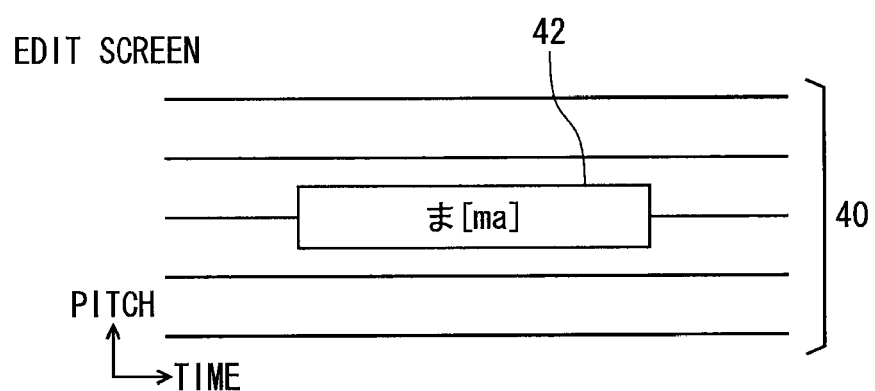
FIGS. 3A and 3B are time-series schematic views of an edit image and a sound segment.

The display controller 22 of FIG. 1 causes the display device 16 to display an edit screen 40 of FIG. 3A that the user views for generating and editing the synthesis information Z. As shown in FIG. 3A, the edit screen 40 is an image (a musical sheet type or a piano role type image) in which a time axis (horizontal axis) and a pitch axis (vertical axis) intersecting with each other are set. By appropriately operating the input device 14 while referring to the edit screen 40, the user can provide the sound synthesizing apparatus 100 with instructions as to the arrangement of musical note images 42 which are graphics into which the sounds to be synthesized are converted, the positions and size changes of the musical note images 42 and the specification of the uttered letters (for example, syllables of the lyrics) for the sounds to be synthesized. The format of the edit screen 40 is arbitrary. For example, a list of the numerical values of the pieces (the sound segment Za, the pitch Zb, the utterance time Zc, the duration Zd and the sound level Ze) of the synthesis information Z may be displayed as the edit screen 40.

Figure 3B:

The information generator 24 of FIG. 1 generates or updates the synthesis information Z in response to an instruction from the user to the edit screen 40. Specifically, the information generator 24 sets the sound segments Za of the synthesis information Z according to the uttered letters specified for the musical note images 42. For example, for an uttered letter "ま [ma]" illustrated in FIG. 3A, as shown in FIG. 3B, it is converted into four sound segments Za, [#-m], [m-a], [a] and [a-#] (#: unvoiced sound). While diphones are illustrated in the above illustration, for example, when monophones are used, the uttered letter "ま [ma]" is converted into two sound segments Za, [m] and [a], and when triphones are used, it is converted into two sound segments Za, [#-m-a] and [a-#]. Moreover, the information generator 24 sets the pitches Zb according to the positions of the musical note images 42 on the pitch axis, sets the utterance times Zc of the sound segments Za according to the positions of the musical note images 42 on the time axis, and sets the durations Zd according to the lengths of the musical note images 42 on the time axis. The sound levels Ze are similarly set in response to an instruction from the user.

Figure 4:
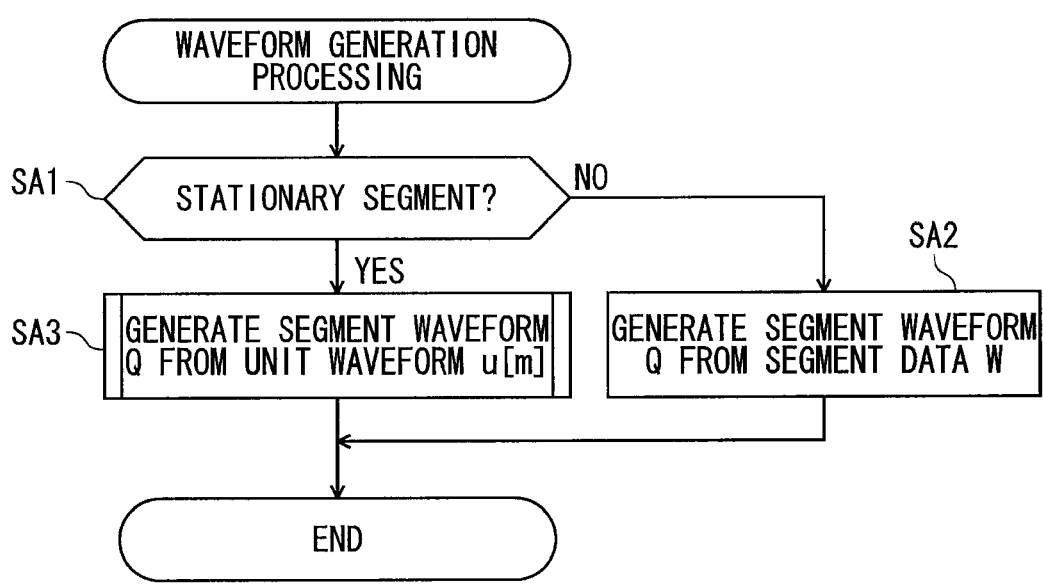
FIG. 4 is a flowchart of an operation of a sound synthesizer.

The segment selector 26 successively selects the segment data W corresponding to the sound segments Za specified by the synthesis information Z, from the segment group G of the storage device 12 at the time points corresponding to the utterance times Zc of the sound segments Za. The sound synthesizer 28 generates the sound signal SOUT by using the segment data W selected by the segment selector 26. Specifically, for each sound segment of the segment data W selected by the segment selector 26 (hereinafter, referred to as "selected segment"), the sound synthesizer 28 generates, from the segment data W, a segment waveform Q adjusted to the pitch Zb, the duration Zd and the sound level Ze specified by the synthesis information Z for the selected segment, and couples the adjacent segment waveforms Q together to thereby generate the sound signal SOUT. FIG. 4 is a flowchart of the processing of the sound synthesizer 28 generating the segment waveform Q. Every time the segment selector 26 selects the segment data W, the processing of FIG. 4 is executed.

When the segment selector 26 selects the segment data W, the sound synthesizer 28 determines whether the selected segment is a stationary segment or not (SA1). While the method of discriminating between the stationary segment and the articulation segment is arbitrary, for example, a configuration may be adopted in which information representative of the kind (stationary segment/articulation segment) of the sound segment is previously added to the segment data W and with reference to the information, the sound synthesizer 28 discriminates between the stationary segment and the articulation segment. When the selected segment is an articulation segment (SA1: NO), the sound synthesizer 28 adjusts the segment data W selected by the segment selector 26 (the sound waveform Va of FIG. 2A), to the pitch Zb, the duration Zd and the sound level Ze specified by the information Z for the selected segment, thereby generating the segment waveform Q of the selected segment (SA2).

On the other hand, when the selected segment is a stationary segment (SA1: YES), the sound synthesizer 28 selectively arranges on the time axis the number M of unit waveforms u[1] to u[M] included in the segment data W of the selected segment, thereby executing the processing of generating the segment waveform Q (hereinafter, referred to as "waveform generation processing") (SA3).

Figure 5:
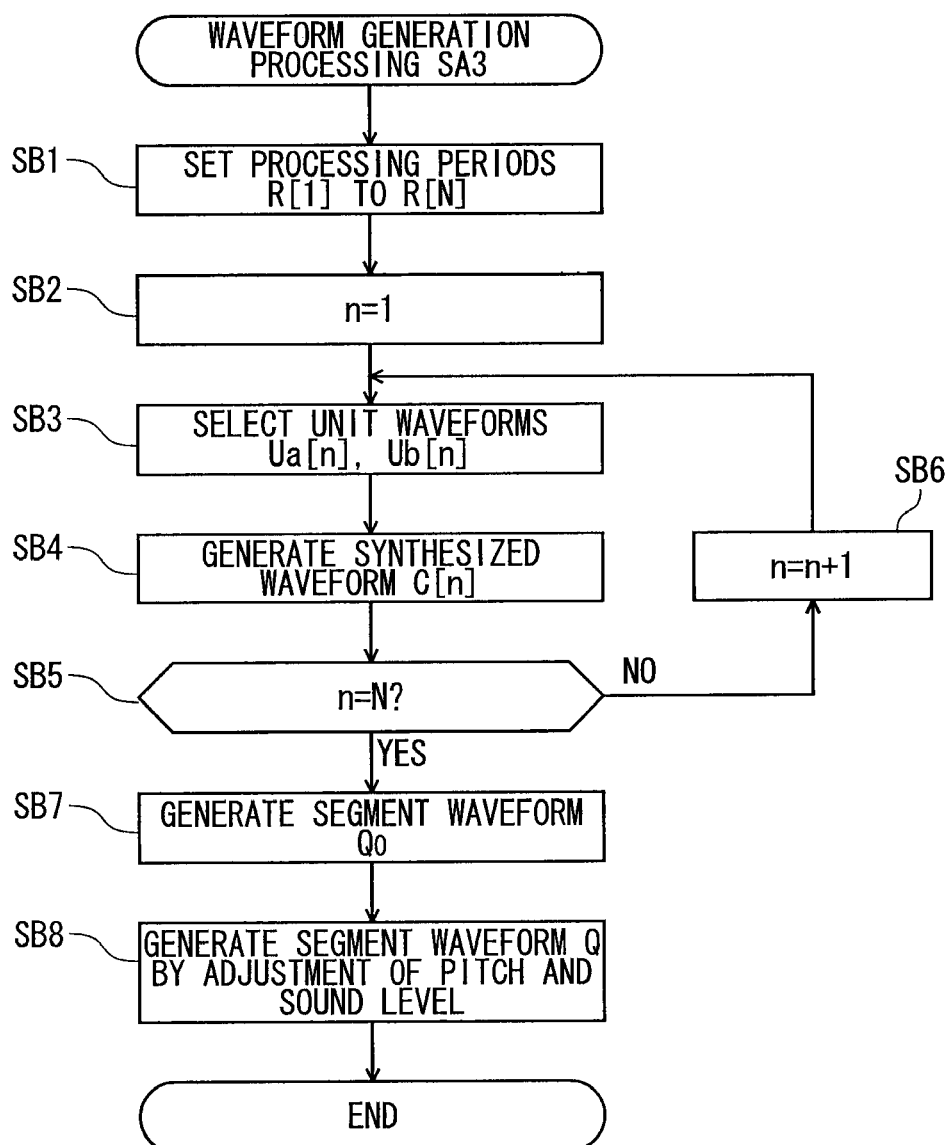
FIG. 5 is a flowchart of waveform generation processing of generating a segment waveform of a stationary segment.
Figure 6:
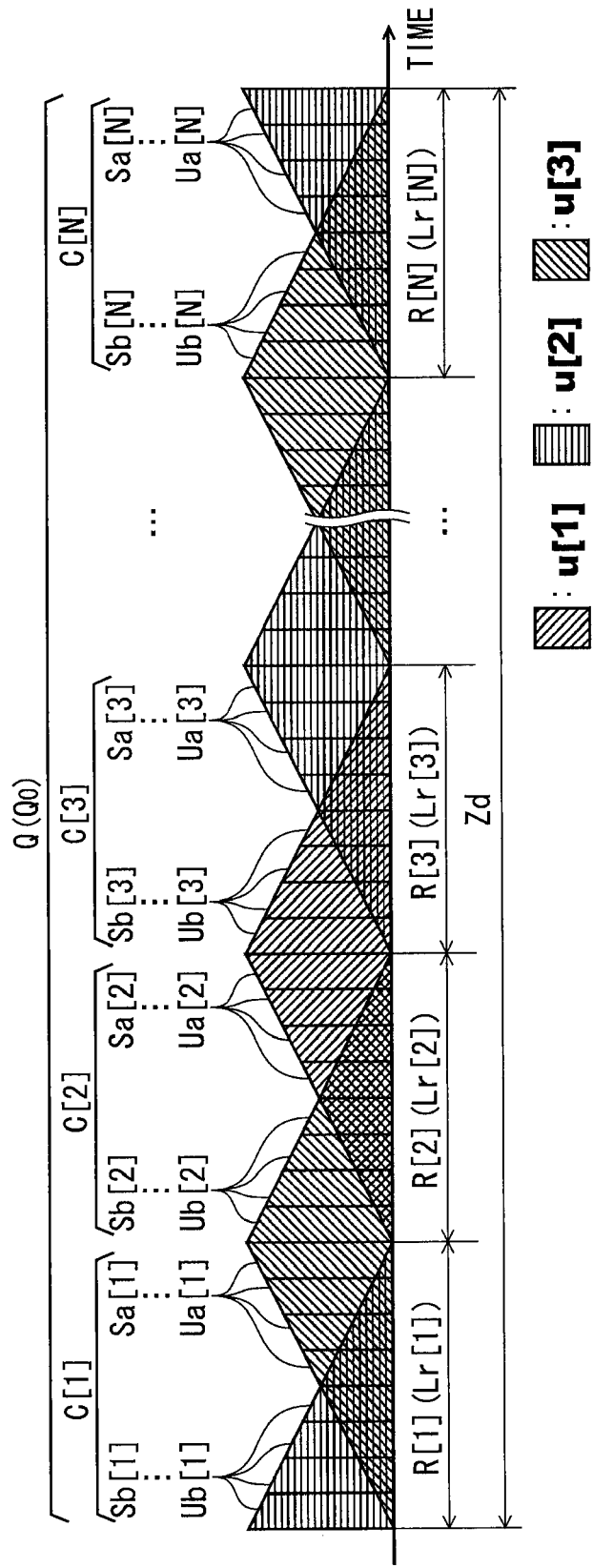
FIG. 6 is an explanatory view of the waveform generation processing.

FIG. 5 is a flowchart of the waveform generation processing (the processing SA3 of FIG. 4), and FIG. 6 is an explanatory view of the waveform generation processing. Starting the processing of FIG. 5, as shown in FIG. 6, the sound synthesizer 28 divides the duration Zd specified by the synthesis information Z for the selected segment, into a number N of processing periods R[1] to R[N] (SB1). The time lengths Lr[n] of the processing periods R[n] (n=1 to N) are set in a random manner. Here, the time lengths Lr[n] each correspond to an integral multiple of the duration T0 of the unit waveform u[m], and the sum of the number N of time lengths Lr[1] to Lr[N] coincides with the duration Zd as the following expression (1).

$$Lr[1]+Lr[2]+\ldots+Lr[N]=Zd \quad (1)$$

The time length Lr[n] of the first embodiment is defined as the value of addition of a reference length L0 and a fluctuation length d[n] as the following expression (2).

$$d[n](Lr[n]=L0+d[n]) \quad (2)$$

The sound synthesizer 28 sets the number N of fluctuation lengths d[n] in a random manner within a predetermined range and adds the fluctuation lengths d[n] to the predetermined reference length L0 to thereby set the time lengths Lr[n] of the processing periods R[n]. Consequently, the time lengths Lr[n] of the processing periods R[n] can be different. Moreover, the number N of the processing periods R[n] varies according to the duration Zd.

As shown in FIG. 6, the sound synthesizer 28 selectively arranges on the time axis the number M of unit waveforms u[1] to u[M] included in the segment data W of the selected segment, thereby generating the synthesized waveform C[n] of the time length Lr[n] for each processing period R[n] (SB2 to SB6). A waveform into which the number N of synthesized waveforms C[n] are coupled is applied to the generation of the sound signal SOUT as the segment waveform Q. In FIG. 6, the temporal variation of the intensity (the amplitude or the power) of each unit waveform u[m] is schematically shown.

The sound synthesizer 28 initializes to 1 the variable n specifying one processing period R[n] (SB2). Then, from among the number M of unit waveforms u[1] to u[M] included in the segment data W of the selected segment, the sound synthesizer 28 selects two different unit waveforms u[m] as a first unit waveform Ua[n] and a second unit waveform Ub[n] (SB3).

Specifically, the sound synthesizer 28 selects the first unit waveform Ua[n−1] in the immediately preceding processing period R[n−1] as the second unit waveform Ub[n] of the current processing period R[n], and selects the first unit waveform Ua[n] of the processing period R[n] in a random manner from among a number (M−1) of unit waveforms where the second unit waveform Ub[n] is excluded from the number M of unit waveforms u[1] to u[M]. For the first processing period R[1], one arbitrary unit waveform u[m] of the number M of unit waveforms u[1] to u[M] (for example, one selected from among the number M of unit waveforms in a random or fixed manner) is selected as the second unit waveform Ub[n].

For example, as shown in FIG. 6, in the first processing period R[1] in the duration Zd, the unit waveform u[3] is selected as the first unit waveform Ua[1], and the unit waveform u[2] is selected as the second unit waveform Ub[1]. In the immediately succeeding processing period R[2], the unit waveform u[1] is selected as the new first unit waveform Ua[2], and the unit waveform u[3] is selected as the second unit waveform Ub[2] successively from the processing period R[1]. Moreover, in the processing period R[3], the unit waveform u[2] is selected as the new first unit waveform Ua[3], and the unit waveform u[1] is selected as the second unit waveform Ub[3] successively from the processing period R[2].

After selecting the first unit waveform Ua[n] and the second unit waveform Ub[n] in the processing period R[n] as described above, the sound synthesizer 28 generates, as shown in FIG. 6, the synthesized waveform C[n] in the processing period R[n] by cross-fading a first waveform series Sa[n] in which a plurality of first unit waveforms Ua[n] are arranged and a second waveform series Sb[n] in which a plurality of second unit waveforms Ub[n] are arranged (SB4). Specifically, the first waveform series Sa[n] is a time series in which a number (Lr[n]/T0) of first unit waveforms Ua[n] over the time length Lr[n] of the processing period R[n] are arranged in a state of being adjusted so that the intensities (amplitudes) of the first unit waveforms Ua[n] increase with time. On the other hand, the second waveform series Sb[n] is a time series in which the number (Lr[n]/T0) of second unit waveforms Ub[n] over the time length Lr[n] of the processing period R[n] are arranged in a state of being adjusted so that the intensities (amplitudes) of the second unit waveforms Ub[n] decrease with time. The sound synthesizer 28 generates the synthesized waveform C[n] by adding the first waveform series Sa[n] and the second waveform series Sb[n] together.

The sound synthesizer 28 determines whether the synthesized waveforms C[n] (C[1] to C[N]) have been generated for all of the number N of processing periods R[1] to R[N] or not (SB5). When the result of the processing SB5 is negative, the sound synthesizer 28 adds 1 to the variable n (SB6), and executes the processing SB3 to the processing SB5 for the processing period R[n] corresponding to the updated variable n (that is, the processing period R[n] immediately succeeding the processing period R[n−1] for which the synthesized waveform C[n−1] is immediately previously generated, thereby generating the synthesized waveform C[n].

When the generation of the number N of synthesized waveforms C[1] to C[N] is completed by repeating the above processing (SB5: YES), the sound synthesizer 28 arranges the number N of synthesized waveforms C[1] to C[N] on the time axis to thereby generates a segment waveform QO (SB7). Then, the sound synthesizer 28 adjusts the segment waveform QO generated by the processing SB7, to the pitch Zb and the sound level Ze specified by the synthesis information Z for the selected segment, thereby generating the segment waveform Q (SB8). As is understood from the above explanation, the segment waveform Q of the pitch Zb and the sound level Ze over the duration Zd specified by the synthesis information Z for the selected segment is generated for the selected segment. As described above, the sound signal SOUT is generated by coupling the segment waveform Q generated by the processing SA2 for the articulation segment and the segment waveform Q generated by the waveform generation processing SA3 (processing SB8) for the stationary segment.

As is understood from the above explanation, in the first embodiment, of the sound waveforms Vb, the number M of unit waveforms u[1] to u[M] extracted from different positions on the time axis are selected as appropriated and arranged to thereby generate the synthesized waveform C[n]. Consequently, for example, compared with the configuration in which one sound waveform Vb is repeated when the stationary phoneme is generated (for example, the configuration of JP-A-2007-240564), an advantage is produced that the periodicity of the feature change caused in the sound signal SOUT by the repetition of the sound waveform Vb is difficult to be perceived by the listener (that is, a high quality sound signal SOUT can be generated).

In the first embodiment, in particular, since the synthesized waveform C[n] is generated by cross-fading the first waveform series Sa[n] and the second waveform series Sb[n], for example, compared with the configuration in which a plurality of unit waveforms n[m] are selectively arranged to generate the synthesized waveform C[n], the effect that the periodicity of the feature change in the segment waveform Q is difficult to be perceived is particularly remarkable. Moreover, in the first embodiment, since the processing periods R[n] can be set to different time lengths Lr[n], compared with the configuration in which the number N of processing periods R[1] to R[N] are set to an equal time length, the effect that the periodicity of the feature change in the segment waveform Q is difficult to be perceived is particularly remarkable. Moreover, in the first embodiment, the unit waveform u[m] selected as the first unit waveform Ua[n−1] in the processing period R[n−1] is successively selected as the second unit waveform Ub[n] in the immediately succeeding processing period R[n]. Consequently, compared with the configuration in which the first unit waveform Ua[n] and the second unit waveform Ub[n] are both selected independently of the waveform to be selected in the immediately preceding processing period R[n], an advantage is produced that the periodicity of the feature change in the segment waveform Q is reduced.

Moreover, in the first embodiment, since a plurality of parts (unit waveforms u[m]) extracted from the sound waveform Vb are stored in the storage device 12, compared with the configuration in which all the section of the sound waveform Vb is stored in the storage device 12, an advantage is also produced that the storage capacity necessary for the storage device 12 is reduced. In particular, in the first embodiment, since one period of sound waveform Vb is stored in the storage device 12 as each unit waveform u[m], the effect of storage capacity reduction is particularly remarkable. For portable apparatuses such as portable telephones and portable information terminals, for example, since the limitation of the storage capacity is large compared with desktop information processing apparatuses, the first embodiment that reduction of enables storage capacity is particularly effective when the sound synthesizing apparatus 100 is mounted on portable apparatuses and the like.

B: Second Embodiment

Figure 7:
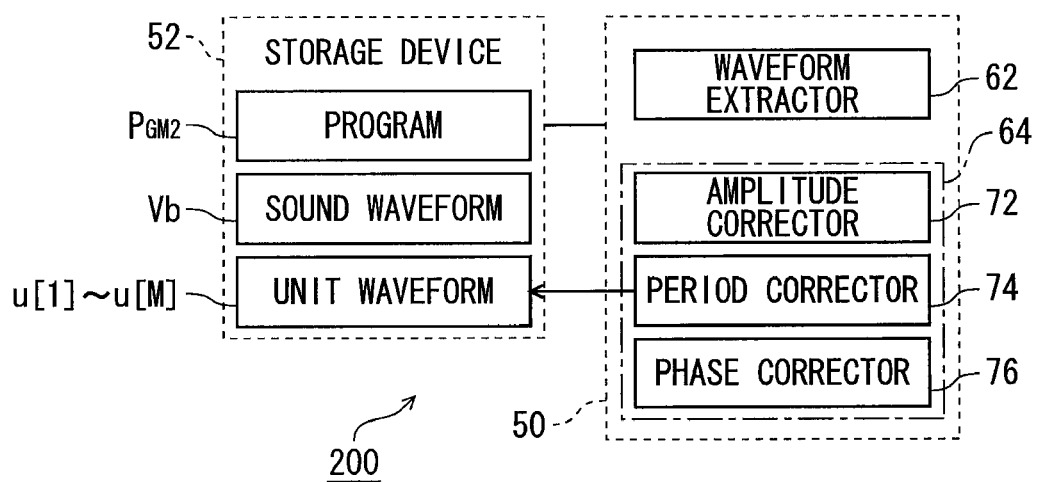
FIG. 7 is a block diagram of a sound processing apparatus according to a second embodiment.

FIG. 7 is a block diagram of a sound processing apparatus 200 according to a second embodiment of the present invention. The sound processing apparatus 200 generates the number M of unit waveforms u[1] to u[M] used for generating the segment waveform Q of the stationary phoneme in the sound synthesizing apparatus 100 of the first embodiment.

As shown in FIG. 7, the sound processing apparatus 200 is implemented as a computer system including an arithmetic processing unit 50 and a storage device 52. The storage device 52 stores a program PGM2 executed by the arithmetic processing unit 50 and various pieces of information stored by the arithmetic processing unit 50. For example, the sound waveform Vb as the material for the number M of unit waveforms u[1] to u[M] are stored in the storage device 52. The sound waveform Vb is a sample series representative of a sound which is temporally continuously uttered sound segments of a voiced sound. For example, the sound waveform Vb picked up by a sound pick-up device (not shown) connected to the sound processing apparatus 200 and the sound waveform Vb supplied from various kinds of storage media such as an optical disk or a communication network such as the Internet are stored in the storage device 52. Although only one sound waveform Vb is referred to for the sake of convenience in the following description, in actuality, a plurality of sound waveforms Vb corresponding to different sound segments are stored in the storage device 52, and a plurality of unit waveforms u[m] illustrated below are successively generated for each sound waveform Vb.

The arithmetic processing unit 50 executes the program PGM2 stored in the storage device 52, thereby implementing a plurality of functions (a waveform extractor 62 and a waveform corrector 64) for generating the number M of unit waveforms u[1] to u[M] from the sound waveform Vb. The following configurations may be adopted: a configuration in which the functions of the arithmetic processing unit 50 are distributed to a plurality of integrated circuits; and a configuration in which a dedicated electronic circuit (for example, DSP) implements the functions.

FIG. 8 shows the sound waveform Vb (envelope) stored in the storage device 52. As shown in FIG. 8, the waveform extractor 62 extracts the number M (three in the following illustration) of unit waveforms x[1] to x[M] from different positions, on the time axis, of the sound waveform Vb stored in the storage device 52. Each of the unit waveforms x[m] is a section corresponding to one period of the sound waveform Vb. For the extraction of the unit waveforms x[m], a known technology is arbitrarily adopted.

Even when an utterer continuously utters one sound segment, since the acoustic features (the amplitude and the period) of the actual unit waveform Vb fluctuate with time, the acoustic features of the unit waveforms x[m] extracted from the sound waveform Vb can be different. The waveform corrector 64 of FIG. 7 corrects (normalizes) the acoustic features of the unit waveforms x[m] so as to be similar to one another, thereby generating the number M of unit waveforms u[1] to u[M]. As shown in FIG. 7, the waveform corrector 64 includes an amplitude corrector 72, a period corrector 74 and a phase corrector 76.

As shown in FIG. 8, because of the temporal amplitude fluctuation of the sound waveform Vb, the peak-to-peak values A[m] of the intensities (amplitudes) of the unit waveforms x[m] can be different. The peak-to-peak value A[m] means the difference between the maximum and minimum values of the intensity of the unit waveform x[m] (total amplitude). The amplitude corrector 72 corrects the unit waveforms x[m] so that the peak-to-peak values A[m] of the unit waveforms x[m] are adjusted to a predetermined value A0 (for example, extends or contracts the unit waveforms x[m ] in the amplitude direction), thereby generating unit waveforms yA[m] (yA[1] to yA[M]). While the method of correction by the amplitude corrector 72 is arbitrary, for example, a method is suitable in which the unit waveform x[m] is multiplied by the ratio (A0/A[m]) of the predetermined value A0 to the peak-to-peak value A[m] as a correction value.

Moreover, because of the temporal period fluctuation of the sound waveform Vb, the time lengths (one period of the sound waveform Vb) T[m] of the unit waveforms x[m] can be different. The period corrector 74 of FIG. 7 corrects the unit waveforms yA[m] so that the periods T[m] of the unit waveforms yA[m] after the correction by the amplitude corrector 72 is adjusted to the predetermined value T0, thereby generating unit waveforms yB[m] (yB[1] to yB[M]). While the method of correction by the period corrector 74 is arbitrary, for example, a method illustrated below is suitable.

Figure 9A:
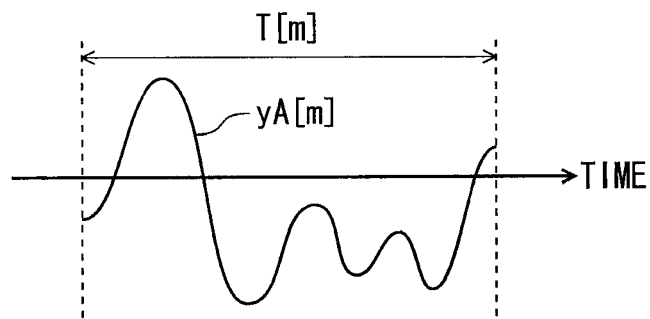
FIGS. 9A to 9C are explanatory views of an operation of a period corrector.
Figure 9B:
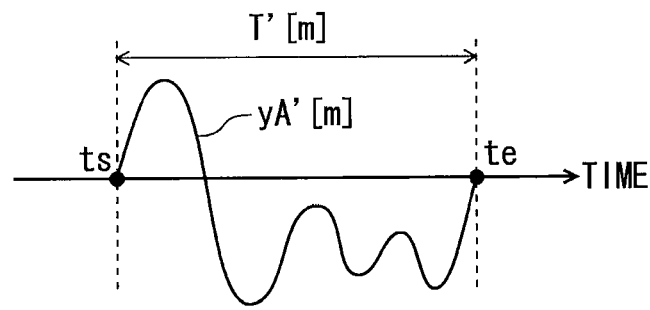
Figure 9C:
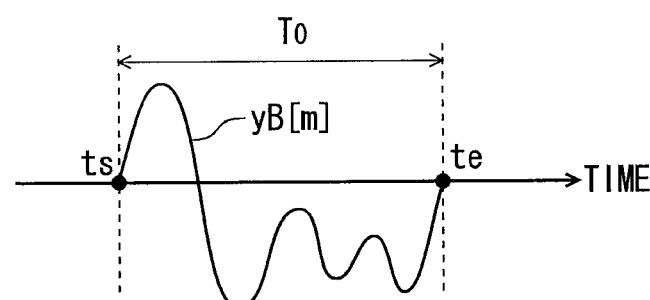

FIG. 9A is a waveform chart of the unit waveform yA[m] after the correction by the amplitude corrector 72. Firstly, as illustrated in FIG. 9B, the period corrector 74 extends or contracts the unit waveforms yA[m] on the time axis to thereby generate the unit waveforms yA'[m] (yA'[1] to yA'[M]) of the time length T'[m]. The time length T'[m] is an integral multiple of the sampling period of the sound waveform Vb, and is set to the time length closest to the time length T[m] of the unit waveforms yA[m] (for example, the integral part of the time length T[m]). The unit waveforms yA'[m] are generated so that the intensity (signal value) is zero at the starting point ts and at the end point te. Secondly, as illustrated in FIG. 9C, the period corrector 74 extends or contracts the unit waveforms yA'[m] on the time axis to thereby generate the unit waveforms yB[m] (yB[1] to yB[M]) of the time length T0. The time length T0 is set, for example, to the mode value of the time length T'[m] of the unit waveforms yA'[m] (consequently, an integral multiple of the sampling period).

The peak-to-peak value A0 and the time length T0 of the number M of unit waveforms yB[1] to yB[M] are normalized (commonalized) by the above processing, and depending on the position on the time axis of the unit waveforms x[m] extracted from the sound waveform Vb as one period by the waveform extractor 62, there is a possibility that the waveform correlation among the unit waveforms yB[m] is low. For example, there is a difference that in the unit waveform yB[1] of FIG. 10A, the maximum (peak) comes immediately after the starting point and in the unit waveform yB[2] of FIG. 10B, the minimum (dip) comes immediately after the staring point. The phase corrector 76 of FIG. 7 corrects the phases of the unit waveforms yB[m] so that the waveform correlation increases among the number M of unit waveforms yB[1] to yB[M] after the correction by the period corrector 74, thereby generating the unit waveforms u[m] (u[1] to u[M]).

Figure 10A:
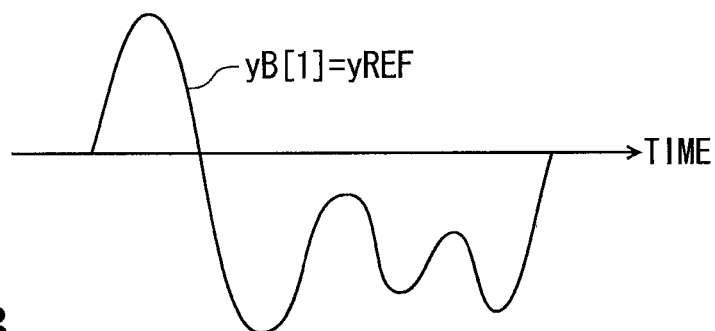
FIGS. 10A to 10C are explanatory views of an operation of a phase corrector.
Figure 10B:
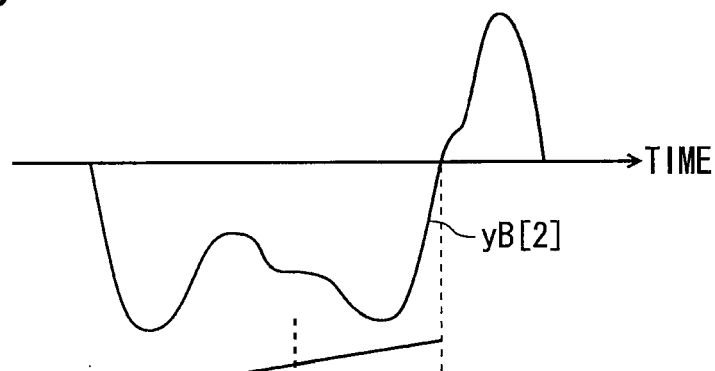
Figure 10C:
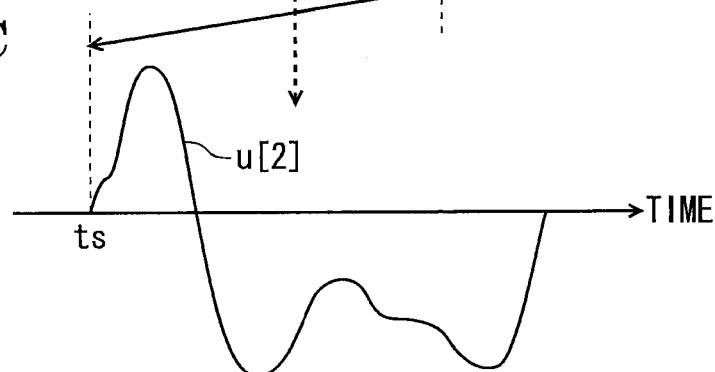

The phase corrector 76 selects, as a reference waveform yREF, one unit waveform yB[m] from among the number M of unit waveforms yB[1] to yB[M] after the correction by the period corrector 74. FIG. 10 illustrates a case where the unit waveform yB[1] shown in FIG. 10A is selected as the reference waveform yREF. The phase corrector 76 calculates the cross-correlation function Fm(τ) with the reference waveform yREF for each of the number (M−1) of unit waveforms yB[m] other than the reference waveform yREF. The variable τ is the time difference (shift amount) of the unit waveform yB[m] from the reference waveform yREF. The phase corrector 76 moves the stating point ts of the unit waveform yB[m] on the time axis (phase-shifts the unit waveform yB[m]) by the time of the variable τ where the cross-correlation function Fm(τ) is highest as illustrated in FIG. 10C, thereby generating the unit waveform u[m]. As shown in FIG. 10C, the section of the unit waveform yB[m] preceding the starting point ts after the movement is added to the end of the unit waveform yB[m]. The following may be performed: The waveform extractor 62 extracts two periods of sound waveform Vb as the unit waveform x[m], and the phase corrector 76 extracts, as the unit waveform u[m], one period of the waveform starting from the time point when the time of the variable τ where the cross-correlation function Fm(τ) is highest has elapsed from the starting point ts of the unit waveform yB[m].

As is understood from the above explanation, the number M of unit waveforms u[1] to u[M] in the first embodiment is in a relationship such that the peak-to-peak value A0 and the time length T0 are common and the phases are adjusted so that the cross-correlation functions Fm(τ) are highest. The number M of unit waveforms u[1] to u[M] generated by the waveform corrector 64 are stored in the storage device 52 as shown in FIG. 7, and transferred to the storage device 12 of the sound synthesizing apparatus 100 of the first embodiment, for example, through a communication network or a portable recording medium.

In the second embodiment, since the peak-to-peak values of the number M of unit waveforms u[1] to u[M] are adjusted to the predetermined value A0, compared with the configuration in which the peak-to-peak value is different among the unit waveforms u[m], the amplitude fluctuation of the synthesized waveform C[n] (segment waveform Q) generated by using the unit waveforms u[m] is suppressed. In addition, since the time lengths of the number M of unit waveforms u[1] to u[M] are adjusted to the predetermined value T0, compared with the configuration in which the time lengths of the unit waveforms u[m] are different from one another, the period (pitch) fluctuation of the synthesized waveform C[n] generated by using the unit waveforms u[m] is suppressed. Consequently, for the section of the stationary segment (stationary part) of the sound to be synthesized where the amplitude and period fluctuations are small, a sound giving an impression of being natural auditorily can be generated.

Moreover, when the correlation among the unit waveforms u[m] is low, there is a possibility that the first unit waveform Ua[n] and the second unit waveform Ub[n] are cancelled out by each other in the stage of adding (crossfading) the first waveform series Sa[n] and the second waveform series Sb[n] and this makes the reproduced sound of the synthesized waveform C[n] an auditorily unnatural sound. In the second embodiment, since the phase of each unit waveform u[m] is adjusted so that the cross-correlation function Fm(τ) is highest, a sound giving an impression of being natural auditorily can be generated.

The order of the processings by the elements of the waveform corrector 64 are changed as appropriate. For example, a configuration may be adopted in which the amplitude corrector 72 corrects the amplitude after the period correction by the period corrector 74. Moreover, the elements of the waveform corrector 64 may be omitted as appropriate. That is, the waveform corrector 64 may include at least one of the amplitude corrector 72, the period corrector 74 and the phase corrector 76.

C: Third Embodiment

Figure 11:
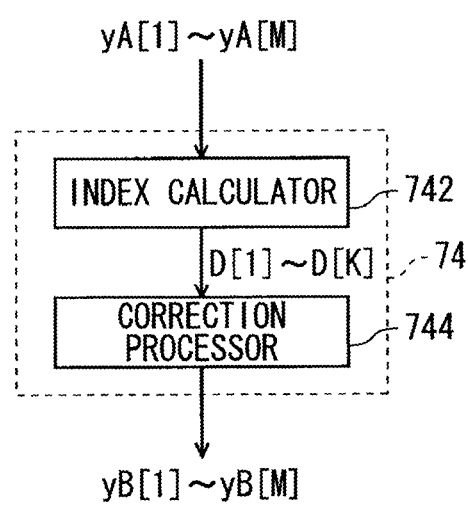
FIG. 11 is a block diagram of the phase corrector in a third embodiment.
Figure 12:
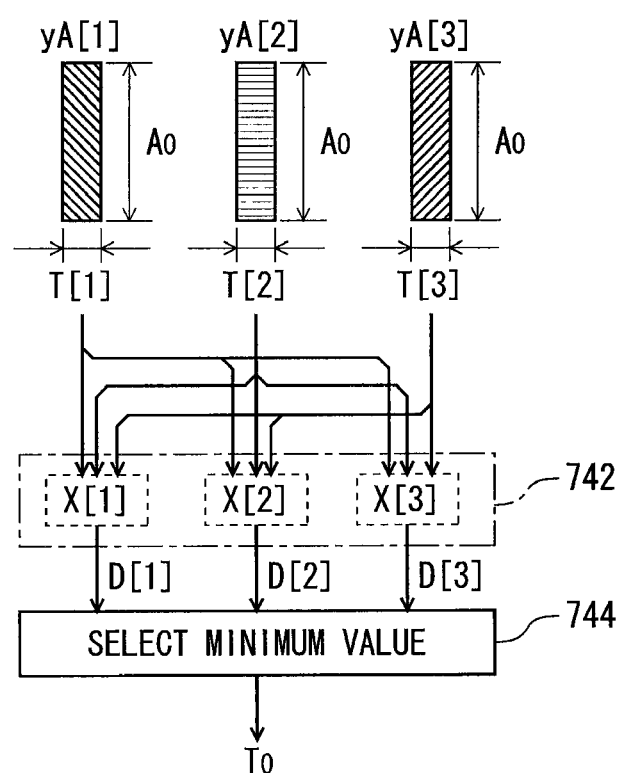
FIG. 12 is an explanatory view of the operation of the period corrector in the third embodiment.

As described in the second embodiment, the period corrector 74 adjusts the periods T[m] of the unit waveforms yA[m] to the predetermined value T0. A third embodiment is a concrete example of the period corrector 74 focusing on the method of selecting the time length (predetermined length T0) of each unit waveform yB[m]. FIG. 11 is a block diagram of the period corrector 74 of the third embodiment, and FIG. 12 is an explanatory view of the operation of the period corrector 74 of the third embodiment. As shown in FIG. 11, the period corrector 74 of the third embodiment includes an index calculator 742 and a correction processor 744.

As shown in FIG. 12, the index calculator 742 calculates a distortion index value D[k] (k=1 to K) for each of a plurality of (a number K of) different candidate lengths x[1] to x[K]. The candidate length X[k] is a time length as a candidate of the predetermined length T0, and is set to a time length which is an integral multiple of the sampling period of the sound waveform Vb. For example, a candidate length X[1] is set to a time length T'[1] of the unit waveform yA'[1]

described in the second embodiment, a candidate length X[2] is set to a time length T'[2] of the unit waveform yA'[2], and a candidate length X[3] is set to a time length T'[3] of the unit waveform yA'[3] (K=M=3). The distortion index value D[k] is an index representative of the degree of distortion, on the time axis, of each unit waveform yA[m] (the degree of the change of each unit waveform yA[m] over a period before and after the extension or contraction) when the number M of unit waveforms yA[1] to yA[M] are extended or contracted from the initial periods T[m] to the common candidate length X[k]. When a case is considered where the number of unit waveforms yA[m] is three (M=3) as in FIG. 12, the distortion index value D[k] is calculated, for example, by the following expression (3):

$$D[k]=|T[1]-X[k]|/X[k]+|T[2]-X[k]|/X[k]+|T[3]-X[k]|/X[k] \quad (3)$$

As is understood from the expression (3), the larger the difference between the periods T[m] of the unit waveforms yA[m] and the candidate length X[k] is (the larger the waveform deformation when extension or contraction to the candidate length X[k] is performed is), the higher the distortion index value D[k] is.

As shown in FIG. 12, the correction processor 744 of FIG. 11 selects as the predetermined length T0 the candidate length X[k] where the degree of distortion represented by the distortion index value D[k] is lowest (that is, the candidate length X[k] corresponding to the lowest distortion index value D[k]) from among the number K of candidate lengths X[1] to X[K], and adjusts the time length (period) T[m] of the unit waveforms yA[m] after the correction by the amplitude corrector 72, to the common predetermined length T0, thereby generating the unit waveforms yB[m]. The method of extending and contracting the unit waveforms yA[m] is similar to that of the second embodiment.

As described above, in the third embodiment, since the predetermined length T0 of the unit waveforms yB[m] after the adjustment is made variable so that the degree of extension or contraction of the number M of unit waveforms yA[1] to yA[M] (the distortion index value D[k]) is lowest, an advantage is produced that the difference between the unit waveforms yA[m] before the correction by the period corrector 74 and the unit waveforms yB[m] after the correction (divergence from the acoustic features of the sound waveform Vb) is reduced.

While in the second embodiment, the decimal parts of the periods T[m] of the unit waveforms yA[m] are rounded down when the time lengths T'[m] of the unit waveforms yA'[m] are calculated, the decimal parts of the periods T[m] of the unit waveforms yA[m] may be rounded up when the time lengths T'[m] of the unit waveforms yA'[m] are calculated. Consequently, in the third embodiment, as illustrated below, time lengths Ta'[m] which are the periods T[m] of the unit waveforms yA[m] the decimal parts of which are rounded down and time lengths Tb'[m] which are the periods T[m] of the unit waveforms yA[m] the decimal parts of which are rounded up may be the candidate lengths X[k].

For example, the candidate length X[1] is set to the time length Ta'[1] where the decimal part of the period T[1] of the unit waveform yA[1] is rounded down, and the candidate length X[2] is set to the time length Tb'[1] where the decimal part of the period T[1] of the unit waveform yA[1] is rounded up. The candidate length X[3] is set to the time length Ta'[2] where the decimal part of the period T[2] of the unit waveform yA[2] is rounded down, and the candidate length X[4] is set to the time length Tb'[2] where the decimal part of the period T[2] of the unit waveform yA[2] is rounded up. Likewise, the candidate length X[5] is set to the time length Ta'[3] where the decimal part of the period T[3] of the unit waveform yA[3] is rounded down, and the candidate length X[6] is set to the time length Tb'[3] where the decimal part of the period T[3] of the unit waveform yA[3] is rounded up. That is, six kinds of candidate lengths X[1] to X[6] corresponding to combinations of the unit waveforms yA[m] and the rounding down and rounding up of the period T[m] are set.

The index calculator 742 calculates the distortion index values D[k] (D[1] to D[6]) by the calculation by the previously shown expression (3) for the candidate lengths X[k], and the correction processor 744 determines as the adjusted predetermined length T0 the candidate length X[k], where the distortion index value D[k] is lowest, of the six candidate lengths X[1] to X[6]. Similar effects as those of the third embodiment are realized by the above configuration.

The method of calculating the distortion index values D[k] is changed as appropriate. For example, while by the previously shown expression (3), the absolute value |T[m]−X[k]| of the difference between the period T[m] and the candidate length X[k] is calculated so that the terms are positive numbers, the terms may be made positive numbers by raising to the second power the ratio of the difference between the period T[m] and the candidate length X[k] to the candidate length X[k] like the following expression (4):

$$D[k]\{(T[1]-X[k])/X[k]\}2+\{(T[2]-X[k])/X[k]\}\}2+\{(T[3]-X[k])/X[k]\}2 \quad (4)$$

D: Fourth Embodiment

Figure 13:
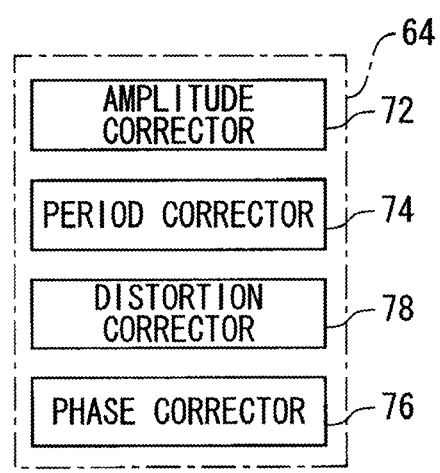
FIG. 13 is a block diagram of a waveform corrector in a fourth embodiment.

FIG. 13 is a block diagram of the waveform corrector 64 in the fourth embodiment. As shown in FIG. 13, the waveform corrector 64 of the fourth embodiment has a configuration in which a distortion corrector 78 is added to the elements illustrated in the above-described embodiments (the amplitude corrector 72, the period corrector 74 and the phase corrector 76).

When the period corrector 74 extends or contracts the periods T[m] of the unit waveforms yA[m] to the time length T0, the peak-to-peak values A[m] of the unit waveforms yB[m] can fluctuate from the peak-to-peak value A0 immediately after the correction by the amplitude corrector 72 (before the correction by the period corrector 74) according to the degree of extension or contraction on the time axis. That is, a distortion occurs in the unit waveforms yB[m] after the correction by the period corrector 74. Specifically, the larger the time length T0 of the unit waveform yB[m] after the correction by the period corrector 74 is than the period T[m] of the unit waveform yA[m] before the correction (the higher the degree of extension is), the lower the peak-to-peak value A[m] of the unit waveform yB[m] is than the peak-to-peak value A0 immediately after the correction by the amplitude corrector 72, and the shorter the time length T0 of the unit waveform yB[m] after the correction by the period corrector 74 is than the period T[m] of the unit waveform yA[m] before the correction (the higher the degree of contraction is), the higher the peak-to-peak value A[m] of the unit waveform yB[m] is than the peak-to-peak value A0. In consideration of the above tendency, the distortion corrector 78 of the fourth embodiment corrects the above-described waveform distortion by adjusting the peak-to-peak values A[m] of the unit waveforms yB[m] after the correction by the period corrector 74.

Specifically, the distortion corrector 78 causes the peak-to-peak value A[m] of the unit waveform yB[m] after the correction by the period corrector 74 to be operated (typically, multiplied) by the ratio (T0/T[m]) of the time length T0 to the initial period T[m] of the unit waveform yA[m] as the correction value. As is understood by the above description, the longer the time length T0 of the unit waveform yB[m] after the correction by the period corrector 74 is than the period T[m] of the unit waveform yA[m] before the correction (the higher the degree of extension by the period corrector 74 is), the higher the value to which the peak-to-peak value A[m] of the unit waveform yB[m] is corrected by the processing by the distortion corrector 78 is. Consequently, an advantage is produced that the waveform distortion resulting from the correction by the period corrector 74 can be suppressed. The processing of the phase corrector 76 correcting the unit waveforms yB[m] after the correction by the distortion corrector 78 to thereby generate the unit waveforms u[m] is similar to that of the second embodiment.

In the above-described fourth embodiment, since the peak-to-peak values A[m] of the unit waveforms yB[m] are corrected according to the degree of extension or contraction of the unit waveforms yA[m] by the period corrector 74, an advantage is produced that unit waveforms u[m] faithfully reflecting the acoustic features of the sound waveform Vb can be generated. The method of selecting the predetermined length T0 in the fourth embodiment is arbitrary; for example, the above-described third embodiment in which the time length T0 is set according to the distortion index value D[k] is suitably adopted.

E: Fifth Embodiment

Figure 14:
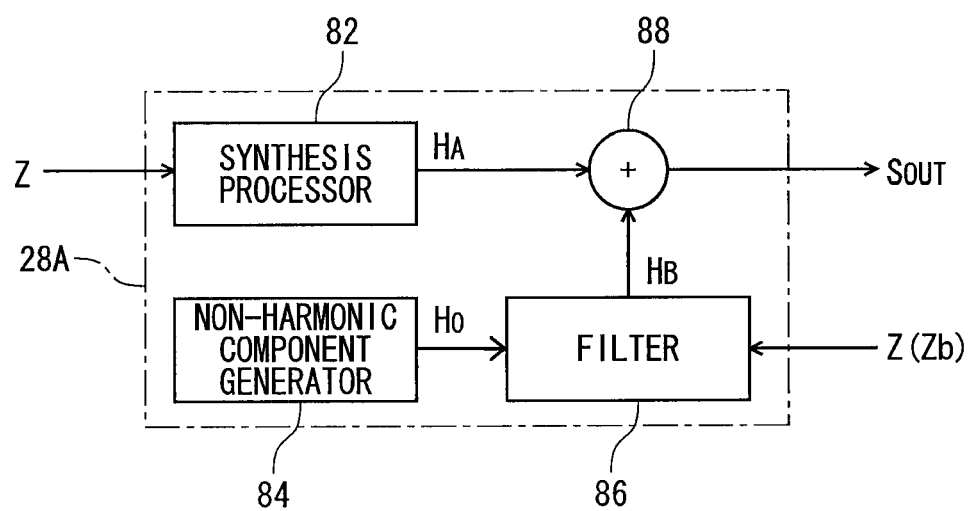
FIG. 14 is a block diagram of a sound synthesizer in a fifth embodiment.

The fifth embodiment has a configuration in which the sound synthesizer 28 of the first embodiment is replaced by a sound synthesizer 28A of FIG. 14. As shown in FIG. 14, the sound synthesizer 28A includes a synthesis processor 82, a non-harmonic component generator 84, a filter 86 and a synthesizer 88. The synthesis processor 82 operates similarly to the sound synthesizer 28 of the first embodiment to generate a sound signal HA. The sound signal HA corresponds to the sound signal SOUT of the first embodiment, and includes an abundance of harmonic components (a fundamental component and an overtone component) corresponding to the pitch Zb and the sound level Ze specified by the synthesis information Z. The reproduced sound based on the sound signal HA abundant in harmonic components as mentioned above can be a sound giving an impression of being artificial. Accordingly, in the fifth embodiment, a non-harmonic component HB is added to the sound signal HA to generate the sound signal SOUT.

The non-harmonic component generator 84 generates a non-harmonic component H0. The non-harmonic component H0 is a noise component such as white noise or pink noise. The filter 86 generates the non-harmonic component HB from the non-harmonic component H0. For example, a comb filter that selectively passes the frequency components, of the non-harmonic component H0, other than the harmonic frequencies (the fundamental frequency and overtone frequencies) corresponding to the pitch Zb is suitable as the filter 86. The synthesizer 88 adds the sound signal HA generated by the synthesis processor 82 and the non-harmonic component HB generated by the filter 86 to thereby generate the sound signal SOUT.

In the above-described fifth embodiment, since the non-harmonic component HB is added to the sound signal HA generated by the synthesis processor 82, an advantage is produced that a sound giving an impression of being natural auditorily can be generated compared with the configuration in which the sound signal HA is singly outputted as the sound signal SOUT. A configuration in which the filter 86 of FIG. 14 is omitted from the sound synthesizer 28A (a configuration in which the non-harmonic component H0 is added to the sound signal HA) may be adopted.

F: Modifications

The above-described embodiments may be modified variously. Concrete modifications will be illustrated below. Two or more modifications arbitrarily selected from among the modifications illustrated below may be combined as appropriate.

(1) Modification 1

The method of generating the synthesized waveform C[n] by using the number M of unit waveforms u[1] to u[M] is changed as appropriate. For example, a configuration may be adopted in which the unit waveforms u[m] successively selected from among the number M of unit waveforms u[1] to u[M] are arranged on the time axis to generate the synthesized waveform C[n]. As is understood from the above explanation, the sound synthesizer 28 of the first embodiment is an example of the element (waveform generator) that arranges the number M of unit waveforms u[1] to u[M] on the time axis to generate the sound signal SOUT.

Figure 15:
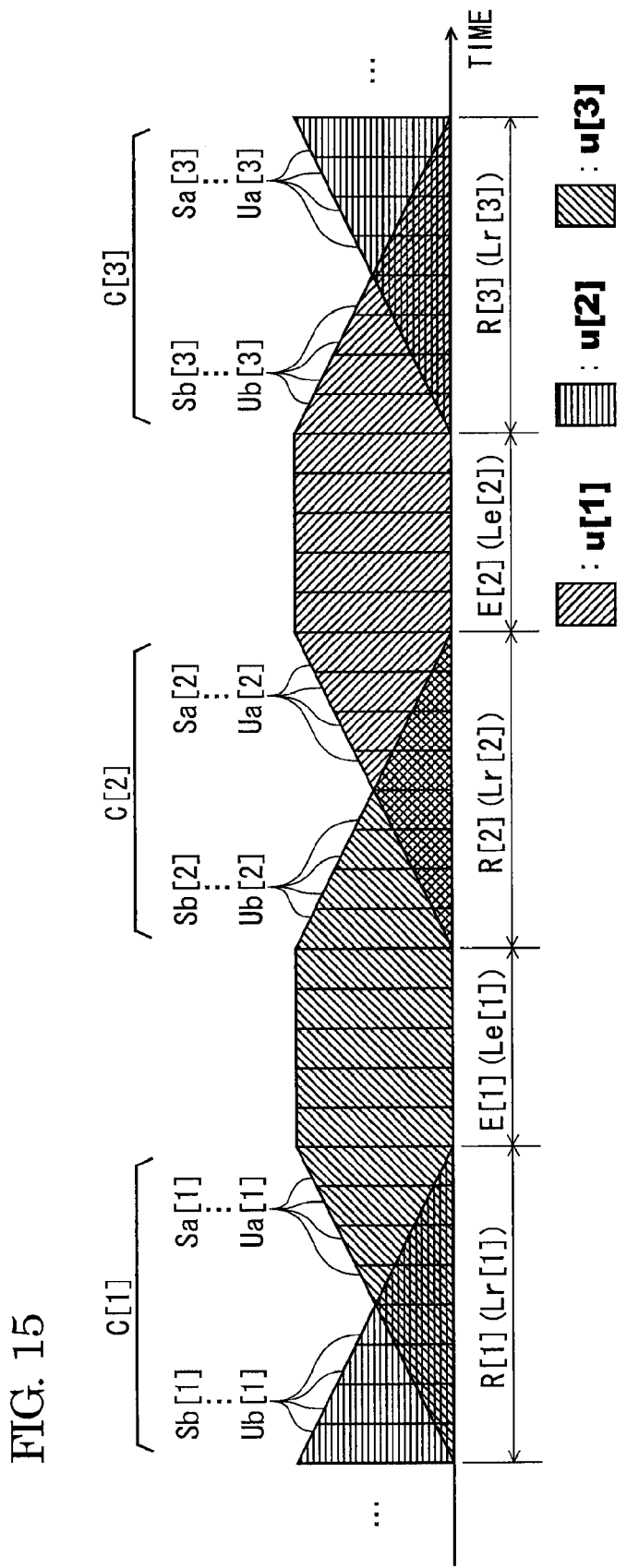
FIG. 15 is an explanatory view of waveform generation processing of generating a segment waveform of a stationary segment in a modification.

Moreover, while the configuration in which the processing periods R[n] continue on the time axis is illustrated in the above-described embodiments, as shown in FIG. 15, a retention period E[n] where a plurality of unit waveforms u[m] are arranged may be interposed between the processing period R[n] and the immediately succeeding processing period R[n+1]. In the retention period E[n], a plurality of first unit waveforms Ua[n] selected in the immediately preceding processing periods R[n] are arranged without the intensities thereof being changed. While the time length Le[n] of each retention period E[n] may be set similarly to the time length Lr[n] of the processing period R[n], for example, in a random manner, it may be set to a common fixed value. As is understood from the illustration of FIG. 15, the configuration in which the adjacent processing periods R[n] continue on the time axis is not essential in the present invention.

(2) Modification 2

The method of setting the processing periods R[n] to different time lengths Lr[n] may be changed as appropriate. For example, the time lengths Lr[1] to Lr[N] of the processing periods R[n] may be made different by calculating the time length Lr[n+1] by an addition or a subtraction of a predetermined value to or from the time length Lr[n]. While the fluctuation length d[n] of the time length Lr[n] is set to a random number in the first embodiment, a configuration in which the time length Lr[n] itself is a random number may be adopted. However, the time lengths Lr[1] to Lr[N] may be set to an equal time.

(3) Modification 3

The method of selecting the first unit waveform Ua[n] and the second unit waveform Ub[n] for each processing period R[n] is arbitrary. For example, a configuration may be adopted in which the number M of unit waveforms u[1] to u[M] are sequentially selected as the first unit waveform Ua[n] for each processing period R[n]. Moreover, while in the first embodiment, the unit waveform u[m] selected as the first unit waveform Ua[n−1] in the processing period R[n−1] is successively selected as the second unit waveform Ub[n] in the immediately succeeding processing period R[n], it may be performed to independently select both of the first unit waveform Ua[n] and the second unit waveform Ub[n] for each processing period R[n].

(4) Modification 4

While the sound processing apparatus 200 different from the sound synthesizing apparatus 100 of the first embodiment is illustrated in the second embodiment, the functions (the waveform extractor 62 and the waveform corrector 64) of the sound processing apparatus 200 to generate the number M of unit waveforms u[1] to u[M] from the sound waveform Vb may be mounted on the sound synthesizing apparatus 100.

(5) Modification 5

In the above embodiments, the segment group G being a set of a plurality of pieces of segment data W, each of the plurality of pieces of segment data W being a set of sample series of a number M of unit waveforms u[1] to u[M], is stored in the storage device 12 in advance. However, the segment group G may be stored in a server (not shown) located in a network. The server is configured by a computer system and is able to be communicated with the sound synthesizing apparatus 100 or the sound synthesizing apparatus 200. In this case, the sound synthesizer 28 successively selects the segment data W from the server for generating the synthesized waveform.

A section of each of the unit waveforms u[m] (m=1 to M) is not limited to a time length corresponding to one period of the sound waveform Vb of a temporally continuous voiced sound. The section of each of the unit waveforms u[m] (m=1 to M) may have a time length corresponding to an integral multiple of the one period of the sound waveform Vb of the temporally continuous voiced sound, such as, two or three periods of the sound waveform Vb. Also, the section of each of the unit waveforms u[m] (m=1 to M) may have a time length corresponding to a real number times of the one period of the sound waveform Vb of the temporally continuous voiced sound, such as, 0.8 times of the one period of the sound waveform Vb, 1.5 times of the one period of the sound waveform Vb and 2.9 times of the one period of the sound waveform Vb.

In a case where the section of each of the unit waveforms u[m] (m=1 to M) has a time length corresponding to the integral multiple of the one period of the sound waveform Vb of the temporally continuous voiced sound, such unit waveforms are preferable for conducting a pitch shift and pitch-tempo shift. Also, in a case where the section of each of the unit waveforms u[m] (m=1 to M) has a time length corresponding to the real number times (excluding the integral multiple) of the one period of the sound waveform Vb of the temporally continuous voiced sound, the above described invention can be applied by conducting the above described cross-fading much longer by a decimal point section of the real number time.

Here, the details of the above embodiments are summarized as follows.

A sound synthesizing apparatus of the present invention includes: a waveform storing section (for example, storage device 12) for storing a plurality of unit waveforms (for example, unit waveforms u[m]) extracted from different positions, on a time axis, of a sound waveform (for example, sound waveform Vb) indicating a voiced sound; and a waveform generating section (for example, sound synthesizer 28) for generating a synthesized waveform (for example, synthesized waveform C[n]) by arranging the plurality of unit waveforms on the time axis. According to this configuration, since the synthesized waveform is generated by arranging, on the time axis, the unit waveforms extracted from different positions, on the time axis, of the sound waveform, compared with the configuration of JP-A-2007-240564 in which the sound waveform is repeated, the sound quality degradation resulting from the repetition of the waveform can be prevented. Moreover, since the unit waveforms extracted from the sound waveform is stored in the waveform storing section, compared with the configuration in which the entire section of the sound waveform is stored, an advantage that the necessary storage capacity is reduced is produced.

In a preferred mode of the present invention, the waveform generating section generates, for each of a plurality of processing periods (for example, processing periods R[n]), a synthesized waveform (for example, synthesized waveform C[n]) which is a sum of a first waveform series (for example, first waveform series Sa[n]) in which a plurality of first unit waveforms (for example, first unit waveforms Ua[n]) selected from among the plurality of unit waveforms are arranged so that the intensities thereof increase with time in the processing period and a second waveform series (for example, second waveform series Sb[n]) in which of the plurality of unit waveforms, a plurality of second unit waveforms (for example, second unit waveform Ub[n]) different from the first unit waveforms are arranged so that the intensities thereof decrease with time in the processing period. According to this mode, since the synthesized waveform is generated by adding (cross-fading) the first waveform series in which the first unit waveforms are arranged and the second waveform series in which the second waveforms are arranged, the effect that the periodicity of the feature change in the segment waveform (for example, segment waveform Q) where the synthesized waveforms of the processing periods are arranged is difficult to be perceived is particularly remarkable. It is not always necessary that the first unit waveform and the second unit waveform be different among all the processing periods on the time axis, a configuration in which processing periods to which the first unit waveform and the second unit waveform are common are present is encompassed by the scope of the present invention. That is, the "plurality of processing periods" in this mode means, of all the processing periods on the time axis, the processing times where the first unit waveform and the second unit waveform are different.

In a concrete example of the mode in which the synthesized waveform is generated by adding the first waveform series and the second waveform series, the first unit waveform in one processing period of the plurality of processing periods and the second unit waveform in a processing period immediately succeeding the one processing period of the processing periods are a common unit waveform. According to this mode, since a common unit waveform is selected as the second waveform in the adjacent processing periods, compared with the configuration in which both the first unit waveform and the second unit waveform are changed for each processing period, the regular feature change in each processing period of the segment waveform can be suppressed.

In a concrete example of the mode in which the synthesized waveform is generated by adding the first waveform series and the second waveform series, the waveform generating section selects the first unit waveform from the unit waveforms in a random manner for each processing period. According to this mode, since the first unit waveform is selected for each processing period, the periodical feature change in each processing period of the segment waveform can be suppressed.

In a concrete example of the mode in which the synthesized waveform is generated by adding the first waveform series and the second waveform series, the waveform generating section makes different the time length of one processing period of the plurality of processing periods and the time lengths of the other processing periods. According to this mode, since the time lengths of the processing periods can be different, compared with the configuration in which the time lengths of all the processing periods are common, the periodical feature change in the segment waveform can be suppressed. The above effect is particularly remarkable when the time lengths of the plurality of processing periods are set in a random manner.

In a preferred mode of the present invention, the plurality of unit waveforms each correspond to one period of the sound waveform. According to this mode, since the unit waveforms each corresponding to one period of the sound waveform are used to generate the synthesized waveform, the effect that both the reduction of the storage capacity and the suppression of the periodicity of the feature change are achieved is particularly remarkable.

In a preferred mode of the present invention, the peak-to-peak value of the intensity (amplitude) of the unit waveform is common to the plurality of unit waveforms. According to this mode, since the peak-to-peak values of the unit waveforms are common, the fluctuation of the amplitude of the synthesized waveform generated from the plurality of unit waveforms is suppressed. Consequently, an advantage is produced that a natural sound the amplitude of which is maintained stationary can be generated.

In a preferred mode of the present invention, the time length of the unit waveform is common among the plurality of unit waveforms. According to this mode, since the time lengths of the unit waveforms are common, the fluctuation of the period of the synthesized waveform generated from the plurality of unit waveforms is suppressed. Consequently, an advantage is produced that a natural sound the period of which is maintained stationary can be generated.

In a preferred mode of the present invention, the plurality of unit waveforms have phases thereof adjusted so that a cross-correlation function between the unit waveforms is highest. According to this mode, since the phases of the unit waveforms are adjusted so that the cross-correlation function therebetween is highest, an advantage is produced that the mutual cancellation between the first unit waveform and the second unit waveform is suppressed and an auditorily natural segment waveform can be generated.

The sound synthesizing apparatus according to the above-described modes is implemented by a cooperation between a general-purpose arithmetic processing unit such as a CPU (central processing unit) and a program as well as implemented by hardware (electronic circuit) such as a DSP (digital signal processor) exclusively used for sound synthesis. The program of the present invention (for example, program PGM1) causes a computer having the waveform storing section for storing a plurality of unit waveforms extracted from different positions, on a time axis, of a sound waveform indicating a voiced sound, to execute waveform generation processing in which the plurality of unit waveforms are arranged on the time axis to generate the synthesized waveform. The waveform generation processing is, for example, the processing of generating, for each of the plurality of processing periods, the synthesized waveform which is a sum of the first waveform series in which the plurality of first unit waveforms selected from among the plurality of unit waveforms are arranged so that the intensities thereof increase with time in the processing period and the second waveform series in which of the plurality of unit waveforms, the plurality of second unit waveforms different from the first unit waveforms are arranged so that the intensities thereof decrease with time in the processing period. According to this program, similar workings and effects to those of the sound synthesizing apparatus of the present invention are realized. The program of the present invention is installed on a computer by being provided from a server apparatus in the form of distribution through a communication network as well as installed on a computer by being provided to the user in the form of being stored in a computer readable recording medium.

Moreover, the present invention may be carried out as a sound processing apparatus generating the plurality of unit waveforms used in the sound synthesizing apparatus according to the above-described modes. The sound processing apparatus of the present invention includes: waveform extracting section (for example, waveform extractor 62) for extracting the plurality of unit waveforms from the different positions, on the time axis, of the sound waveform indicating the voiced sound; and a waveform correcting section (for example, waveform corrector 64) for correcting the plurality of unit waveforms extracted by the waveform extracting section so that acoustic features of the unit waveforms are close to each other.

In a preferred mode of the present invention, the waveform correcting section includes a period correcting section (for example, period corrector 74) for adjusting the time lengths of the plurality of unit waveforms to a common predetermined length. According to this mode, since the periods of the unit waveforms are adjusted to the common predetermined length, the fluctuation of the period of the synthesized waveform can be suppressed. Consequently, a natural sound the period of which is maintained stationary can be generated.

In a preferred embodiment of the present invention, the period correcting section includes: an index calculating section (for example, index calculator 742) for calculating, for each of a plurality of different candidate lengths, a distortion index value representative of the degree of distortion of each unit waveform when the unit waveforms are extended or contracted to the candidate length on the time axis; and a correction processing section (correction processor 744) for selecting as the predetermined length the candidate length where the degree of distortion represented by the distortion index value is lowest, from among the plurality of candidate lengths and adjusting the time lengths of the plurality of unit waveforms to the predetermined length. According to this mode, since the predetermined length after the correction is selected so that the distortion of the unit waveforms is suppressed, unit waveforms faithfully reflecting the acoustic features of the sound waveform can be generated.

A sound processing apparatus according to a preferred mode of the present invention includes a distortion correcting section (for example, distortion corrector 78) for correcting the amplitudes of the unit waveforms so that the larger the predetermined length is than the time length of the unit waveform extracted by the waveform extracting section, the larger the amplitude of the unit waveform is.

According to this mode, since the fluctuation of the amplitude of the unit waveform resulting from the correction by the period correcting section is corrected, the effect that unit waveforms faithfully reflecting the acoustic features of the sound waveform can be generated is particularly remarkable.

The above-described sound processing apparatus is implemented by a cooperation between a general-purpose arithmetic processing unit such as a CPU (central processing unit) and a program as well as implemented by hardware (electronic circuit) such as a DSP (digital signal processor) exclusively used for sound processing. The program of the present invention (for example, program PGM2) is a program for generating the plurality of unit waveforms used for sound synthesis, and causes a computer to execute waveform extraction processing of extracting the plurality of unit waveforms from different positions, on the time axis, of the sound waveform indicating the voiced sound and waveform correction processing of correcting the plurality of unit waveforms extracted by the waveform extraction processing so that the acoustic features of the unit waveforms are close to each other. According to this program, similar workings and effects to those of the sound processing apparatus of the present invention are realized. The program of the present invention is installed on a computer by being provided in the form of distribution through a communication network as well as installed on a computer by being provided in the form of being stored in a computer readable recording medium.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2012-046505 filed on Mar. 12, 2012, the contents of which are incorporated herein by reference.

What is claimed is:

1. A sound synthesizing apparatus comprising:
    a waveform storage configured to store a plurality of unit waveforms extracted from different positions, on a time axis, of a single sound waveform which indicates a voiced sound and is temporally continued, wherein each of the plurality of unit waveforms is shorter in time length than the single sound waveform; and
    one or more first circuits configured to implement the functionality of:
    a waveform generator configured to generate, for each of a first processing period and a second processing period, a synthesized waveform by arranging the plurality of unit waveforms on the time axis, wherein the second processing period is an immediately succeeding processing period after the first processing period,
    wherein, for the first processing period,
    a first unit waveform for the first processing period and a second unit waveform for the first processing period are selected from among the plurality of unit waveforms extracted from the single sound waveform, the second unit waveform for the first processing period being different from the first unit waveform for the first processing period,
    a plurality of instances of the first unit waveform for the first processing period is arranged in a first waveform series for the first processing period so that intensities thereof increase with time in the first processing period,
    a plurality of instances of the second unit waveform for the first processing period is arranged in a second waveform series for the first processing period so that intensities thereof decrease with time in the first processing period,
    the synthesized waveform for the first processing period is a sum of the first waveform series for the first processing period and the second waveform series for the first processing period, the first waveform series for the first processing period and the second waveform series for the first processing period being cross-faded in the synthesized waveform for the first processing period, and
    each of the first unit waveform for the first processing period and the second unit waveform for the first processing period is shorter in time length than the single sound waveform,
    wherein, for the second processing period,
    a first unit waveform for the second processing period and a second unit waveform for the second processing period are selected from among the plurality of unit waveforms extracted from the single sound waveform, the second unit waveform for the second processing period being different from the first unit waveform for the second processing period,
    a plurality of instances of the first unit waveform for the second processing period is arranged in a first waveform series for the second processing period so that intensities thereof increase with time in the second processing period, and
    a plurality of instances of the second unit waveform for the second processing period is arranged in a second waveform series for the second processing period so that intensities thereof decrease with time in the second processing period,
    the synthesized waveform for the second processing period is a sum of the first waveform series for the second processing period and the second waveform series for the second processing period, the first waveform series for the second processing period and the second waveform series for the second processing period being cross-faded in the synthesized waveform for the second processing period, and
    each of the first unit waveform for the second processing period and the second unit waveform for the second processing period is shorter in time length than the single sound waveform.

2. A sound processing apparatus for generating the plurality of unit waveforms used in the sound synthesizing apparatus according to claim 1, the sound processing apparatus comprising:
    one or more second circuits configured to implement the functionality of:
    a waveform extractor configured to extract the plurality of unit waveforms from the different positions, on the time axis, of the single sound waveform which indicates the voiced sound and is temporally continued; and
    a waveform corrector configured to correct the plurality of unit waveforms extracted by the waveform extracting section so that acoustic features of the unit waveforms are close to each other.

3. The sound processing apparatus according to claim 2, wherein the waveform corrector includes a period corrector configured to correct time lengths of the plurality of the unit waveforms so as to be a common predetermined length.

4. The sound processing apparatus according to claim 3, wherein the period corrector includes:
an index calculator configured to calculate, for each of a plurality of candidate lengths being different to each other, a distortion index value indicating a degree of distortion of each of the plurality of unit waveforms when each of the plurality of unit waveforms is extended or contracted to a candidate length on the time axis; and
a correction processor configured to select a candidate length having a distortion index value indicating a minimum degree of distortion from the plurality of candidate lengths as the common predetermined length and to adjust the time lengths of the plurality of the unit waveforms so as to be the common predetermined length.

5. The sound processing apparatus according to claim 3, the one or more second circuits configured to implement the functionality of:
a distortion corrector configured to correct, for the time lengths of the plurality of unit waveforms extracted by the waveform extracting section, amplitudes of the plurality of unit waveforms so that the amplitudes thereof are corrected in accordance with a length of the common predetermined length.

6. The sound synthesizing apparatus according to claim 1, wherein each of the plurality of unit waveforms corresponds to one period of the sound waveform.

7. The sound synthesizing apparatus according to claim 1, wherein the plurality of unit waveforms have a common peak-to-peak value.

8. The sound synthesizing apparatus according to claim 1, wherein the plurality of unit waveforms have a common time length.

9. The sound synthesizing apparatus according to claim 1, wherein the plurality of unit waveforms have phases which are adjusted so that a cross-correlation function between the unit waveforms is highest.

10. The sound synthesizing apparatus according to claim 1, wherein the first unit waveform for the second processing period and the second unit waveform for the first processing period immediately succeeding the second processing period are a common unit waveform.

11. The sound synthesizing apparatus according to claim 1, wherein the waveform generator is configured to select the first unit waveform for the first processing period from the plurality of unit waveforms randomly for the first processing period and to select the first unit waveform for the second processing period from the plurality of unit waveforms randomly for the second processing period.

12. The sound synthesizing apparatus according to claim 1, wherein the waveform generator is configured to set time lengths of the first and second processing periods so that a time length of the first processing period and a time length of the second processing period are different from each other.

13. The sound synthesizing apparatus according to claim 1, wherein the waveform generator is configured to set a time length of each of the first and second processing periods randomly.

14. The sound synthesizing apparatus according to claim 1, wherein each of the unit waveforms has zero intensity at a starting point and at an end point thereof.

15. The sound synthesizing apparatus according to claim 1, wherein a segment waveform includes the first waveform series for the first processing period, the first waveform series for the second processing period, second waveform series for the first processing period, and the second waveform series for the second processing period.

16. The sound synthesizing apparatus according to claim 1, wherein each of the synthesized waveform for the first processing period and the synthesized waveform for the second processing period is generated based on three or more different unit waveforms.

17. A sound synthesizing method comprising:
storing, by a waveform storage, a plurality of unit waveforms extracted from different positions, on a time axis, of a single sound waveform which indicates a voiced sound and is temporally continued, wherein each of the plurality of unit waveforms is shorter in time length than the single sound waveform; and
generating, by one or more circuits, for each of a first processing period and a second processing period, a synthesized waveform by arranging the plurality of unit waveforms on the time axis, wherein the second processing period is an immediately succeeding processing period after the first processing period,
wherein, for the first processing period,
a first unit waveform for the first processing period and a second unit waveform for the first processing period are selected from among the plurality of unit waveforms extracted from the single sound waveform, the second unit waveform for the first processing period being different from the first unit waveform for the first processing period,
a plurality of instances of the first unit waveform for the first processing period is arranged in a first waveform series for the first processing period so that intensities thereof increase with time in the first processing period,
a plurality of instances of the second unit waveform for the first processing period is arranged in a second waveform series for the first processing period so that intensities thereof decrease with time in the first processing period,
the synthesized waveform for the first processing period is a sum of the first waveform series for the first processing period and the second waveform series for the first processing period, the first waveform series for the first processing period and the second waveform series for the first processing period being cross-faded in the synthesized waveform for the first processing period, and
each of the first unit waveform for the first processing period and the second unit waveform for the first processing period is shorter in time length than the single sound waveform,
wherein, for the second processing period,
a first unit waveform for the second processing period and a second unit waveform for the second processing period are selected from among the plurality of unit waveforms extracted from the single sound waveform, the second unit waveform for the second processing period being different from the first unit waveform for the second processing period,
a plurality of instances of the first unit waveform for the second processing period is arranged in a first waveform series for the second processing period so that intensities thereof increase with time in the second processing period, and
a plurality of instances of the second unit waveform for the second processing period is arranged in a second waveform series for the second processing period so that intensities thereof decrease with time in the second processing period, the synthesized waveform for the second processing period is a sum of the first waveform series for the second processing period and the second waveform series for the second processing period, the first waveform series for the second processing period and the second waveform series for the second processing period being cross-faded in the synthesized waveform for the second processing period, and each of the first unit waveform for the second processing period and the second unit waveform for the second processing period is shorter in time length than the single sound waveform.

18. A sound synthesizing method, comprising:

selecting, by one or more circuits, for each of a first processing period and a second processing period, two unit waveforms from a plurality of unit waveforms extracted from different positions, on a time axis, of a single sound waveform which indicates a voiced sound and is temporally continued, wherein each of the plurality of unit waveforms is shorter in time length than the single sound waveform; and generating, by the one or more circuits, for each of the first and second processing periods, a synthesized waveform based on the selected two unit waveforms for each respective processing period, wherein the second processing period is an immediately succeeding processing period after the first processing period, wherein, for the first processing period, the selected two unit waveforms for the first processing period comprise a first unit waveform for the first processing period and a second unit waveform for the first processing period, the second unit waveform for the first processing period being different from the first unit waveform for the first processing period, a plurality of instances of the first unit waveform for the first processing period is arranged in a first waveform series for the first processing period so that intensities thereof increase with time in the first processing period, a plurality of instances of the second unit waveform for the first processing period is arranged in a second waveform series for the first processing period so that intensities thereof decrease with time in the first processing period, the synthesized waveform for the first processing period is a sum of the first waveform series for the first processing period and the second waveform series for the first processing period, the first waveform series for the first processing period and the second waveform series for the first processing period being cross-faded in the synthesized waveform for the first processing period, and each of the first unit waveform for the first processing period and the second unit waveform for the first processing period is shorter in time length than the single sound waveform, wherein, for the second processing period, the selected two unit waveforms for the second processing period comprise a first unit waveform for the second processing period and a second unit waveform for the second processing period, the second unit waveform for the second processing period being different from the first unit waveform for the second processing period, a plurality of instances of the first unit waveform for the second processing period is arranged in a first waveform series for the second processing period so that intensities thereof increase with time in the second processing period, a plurality of instances of the second unit waveform for the second processing period is arranged in a second waveform series for the second processing period so that intensities thereof decrease with time in the second processing period, the synthesized waveform for the second processing period is a sum of the first waveform series for the second processing period and the second waveform series for the second processing period, the first waveform series for the second processing period and the second waveform series for the second processing period being cross-faded in the synthesized waveform for the second processing period and each of the first unit waveform for the second processing period and the second unit waveform for the second processing period is shorter in time length than the single sound waveform.

19. The sound synthesizing method according to claim 18, wherein, in the selecting, the two unit waveforms for the first processing period are selected randomly or definitely and the two unit waveforms for the second processing period are selected randomly or definitely.

20. The sound synthesizing method according to claim 18, further comprising:

generating, by the one or more circuits, a segment waveform by arranging the synthesized waveforms generated for each of the first and second processing periods on the time axis.

21. A sound synthesizing apparatus comprising:

one or more circuits configured to implement the functionality of:

a selecting section configured to select, for each of a first processing period and a second processing period, two unit waveforms from a plurality of unit waveforms extracted from different positions, on a time axis, of a single sound waveform which indicates a voiced sound and is temporally continued, wherein each of the plurality of unit waveforms is shorter in time length than the single sound waveform; and a generating section configured to generate, for each of the first and second processing periods, a synthesized waveform based on the selected two unit waveforms for each respective processing period, wherein the second processing period is an immediately succeeding processing period after the first processing period, wherein, for the first processing period, the selected two unit waveforms for the first processing period comprise a first unit waveform for the first processing period and a second unit waveform for the first processing period, the second unit waveform for the first processing period being different from the first unit waveform for the first processing period, a plurality of instances of the first unit waveform for the first processing period is arranged in a first waveform series for the first processing period so that intensities thereof increase with time in the first processing period, a plurality of instances of the second unit waveform for the first processing period is arranged in a second waveform series for the first processing period so that intensities thereof decrease with time in the first processing period, the synthesized waveform for the first processing period is a sum of the first waveform series for the first processing period and the second waveform series for the first processing period, the first waveform series for the first processing period and the second waveform series for the first processing period being cross-faded in the synthesized waveform for the first processing period, and each of the first unit waveform for the first processing period and the second unit waveform for the first processing period is shorter in time length than the single sound waveform, wherein, for the second processing period, the selected two unit waveforms for the second processing period comprise a first unit waveform for the second processing period and a second unit waveform for the second processing period, the second unit waveform for the second processing period being different from the first unit waveform for the second processing period, a plurality of instances of the first unit waveform for the second processing period is arranged in a first waveform series for the second processing period so that intensities thereof increase with time in the second processing period, a plurality of instances of the second unit waveform for the second processing period is arranged in a second waveform series for the second processing period so that intensities thereof decrease with time in the second processing period, the synthesized waveform for the second processing period is a sum of the first waveform series for the second processing period and the second waveform series for the second processing period, the first waveform series for the second processing period and the second waveform series for the second processing period being cross-faded in the synthesized waveform for the second processing period, and each of the first unit waveform for the second processing period and the second unit waveform for the second processing period is shorter in time length than the single sound waveform.

\* \* \* \* \*